US012636747B2

(12) United States Patent
Tagami et al.

(10) Patent No.: US 12,636,747 B2
(45) Date of Patent: May 26, 2026

(54) AUXILIARY DEVICE AND WORK MACHINE SYSTEM

(71) Applicant: Koki Holdings Co., Ltd., Tokyo (JP)

(72) Inventors: Hiroyuki Tagami, Ibaraki (JP); Naoto Ichihashi, Ibaraki (JP); Yuki Takahashi, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 801 days.

(21) Appl. No.: 17/924,117

(22) PCT Filed: Apr. 23, 2021

(86) PCT No.: PCT/JP2021/016542
§ 371 (c)(1),
(2) Date: Nov. 9, 2022

(87) PCT Pub. No.: WO2021/230050
PCT Pub. Date: Nov. 18, 2021

(65) Prior Publication Data
US 2023/0173629 A1     Jun. 8, 2023

(30) Foreign Application Priority Data

May 12, 2020     (JP) ................................. 2020-083600
Aug. 31, 2020     (JP) ................................. 2020-145382

(51) Int. Cl.
*B23Q 11/00*          (2006.01)
*B04C 5/04*           (2006.01)
(Continued)

(52) U.S. Cl.
CPC ............ *B23Q 11/0046* (2013.01); *B04C 5/04* (2013.01); *B04C 5/185* (2013.01); *B23B 47/34* (2013.01); *B25D 16/00* (2013.01)

(58) Field of Classification Search
CPC ............................ B23Q 11/0046; B23B 47/34
See application file for complete search history.

(56) References Cited

U.S. PATENT DOCUMENTS

| | | | |
|---|---|---|---|
| 2005/0150199 A1 | 7/2005 | Michele et al. | |
| 2006/0107634 A1 | 5/2006 | Ohlendorf | |
| 2006/0150591 A1 | 7/2006 | Borinato | |

FOREIGN PATENT DOCUMENTS

| | | |
|---|---|---|
| CN | 1803397 | 7/2006 |
| CN | 101096097 | 1/2008 |

(Continued)

OTHER PUBLICATIONS

"International Search Report (Form PCT/ISA/210) of PCT/JP2021/016542," mailed on Jul. 6, 2021, with English translation thereof, pp. 1-4.

(Continued)

*Primary Examiner* — Alan Snyder
(74) *Attorney, Agent, or Firm* — JCIPRNET

(57) ABSTRACT

A dust collection device 40 comprises: an intake pipe 53 connected to a suction unit 52; a cyclone unit 60 that swirls air flowing out from the intake pipe 53 and centrifuges dust; and a filter unit 70 that accommodates a filter 72. The filter unit 70 has an outlet 74 connected to the cyclone unit 60 and discharging the air having passed through the filter 72. Therefore, the air and dust near a tip tool T can be separated by the cyclone unit 60. Furthermore, even when the dust remains, the remaining dust can be removed by the filter 72. Furthermore, the intake pipe 53 and the cyclone unit 60 are arranged at positions where the intake pipe 53 and the cyclone unit 60 overlap in a front-rear direction, and the filter unit 70 is disposed behind the cyclone unit 60.

15 Claims, 20 Drawing Sheets

(51) Int. Cl.
    *B04C 5/185*        (2006.01)
    *B23B 47/34*        (2006.01)
    *B25D 16/00*        (2006.01)

(56)              References Cited

FOREIGN PATENT DOCUMENTS

| | | |
|---|---|---|
| CN | 106466833 | 3/2017 |
| CN | 111093894 | 5/2020 |
| DE | 102006029624 | 1/2008 |
| JP | 2005169393 | 6/2005 |
| JP | 2010201526 | 9/2010 |
| JP | 2019042852 | 3/2019 |

OTHER PUBLICATIONS

"Office Action of China Counterpart Application", with English translation thereof, issued on Feb. 28, 2025, pp. 1-13.
"Search Report of Europe Counterpart Application", issued on Sep. 26, 2023, p. 1-p. 7.
"The Third Office Action of China Counterpart Application", issued on Dec. 23, 2025, with English translation thereof, p. 1-p. 12.

AUXILIARY DEVICE AND WORK MACHINE SYSTEM

CROSS-REFERENCE TO RELATED APPLICATION

This application is a 371 application of the International PCT application serial no. PCT/JP2021/016542, filed on Apr. 23, 2021, which claims the priority benefits of Japan Patent Application No. 2020-083600, filed on May 12, 2020 and Japan Patent Application No. 2020-145382, filed on Aug. 31, 2020. The entirety of each of the above-mentioned patent applications is hereby incorporated by reference herein and made a part of this specification.

TECHNICAL FIELD

The present invention relates to an auxiliary device and a work machine system.

BACKGROUND ART

A drilling tool (work machine) disclosed in the following Patent Literature 1 includes a dust collection device (auxiliary device). The dust collection device is configured to suction air containing dust generated during work of the drilling tool, remove the dust from the air, and store the dust. More specifically, a filter is provided inside the dust collection device to remove dust from the air suctioned into the dust collection device.

CITATION LIST

Patent Literature

[Patent Literature 1]
   Japanese Patent Laid-Open No. 2010-201526

SUMMARY OF INVENTION

Technical Problem

However, the dust collection device has the possibility of a decrease in dust collection performance due to clogging of the filter. On the other hand, although the dust collection performance can be improved by increasing the volume of a filter chamber that accommodates the filter, there is a problem in that the body size of the dust collection device increases. In addition, as a method of separating air and dust, a so-called cyclone system-based separation method of swirling air containing dust and separating the air and dust using centrifugal force is known. In a case where a cyclone system is applied to the auxiliary device of the work machine, there is room for improvement in the following points. That is, a work machine that performs drilling or the like may be used in different postures depending on work modes. For example, in some cases, the work machine is used in such a posture that an outlet from a swirling chamber toward a dust collection chamber faces upward. In this case, since dust separated in the swirling chamber is not appropriately discharged to the dust collection chamber and stays in the swirling chamber, there is a possibility of the dust and air not being able to be satisfactorily separated from each other. Further, there is a possibility of an air flow mixed with dust flowing downward with respect to a cyclone unit. That is, there is a possibility of dust collection performance in the auxiliary device decreasing.

The present invention was contrived in view of the above facts, and an objective thereof is to provide an auxiliary device and a work machine equipped with the same which make it possible to improve dust collection performance while suppressing an increase in body size.

Solution to Problem

According to one or more embodiments of the present invention, there is provided an auxiliary device mounted on a work machine to suction air containing dust from around a tip tool of the work machine and discharge the air from which the dust has been separated, the device including: a suction unit having a suction port which is disposed on a periphery of the tip tool; an intake passage portion connected to the suction unit and configured to be stretchable in a first direction; a cyclone unit connected to the intake passage portion to swirl the air having flowed out from the intake passage portion and centrifuge the dust; and a filter unit connected to the cyclone unit, an inside of which is configured as a filter chamber for accommodating a filter, and which has an outlet for discharging the air having passed through the filter, wherein the cyclone unit and the intake passage portion are disposed at positions where they overlap each other in the first direction, and the filter unit is disposed on one side of the cyclone unit in the first direction.

According to one or more embodiments of the present invention, there is provided the auxiliary device, wherein the intake passage portion is disposed on an other side in the first direction with respect to the filter unit.

According to one or more embodiments of the present invention, there is provided the auxiliary device, wherein the cyclone unit is configured to include: a cyclone cylinder unit formed in a cylindrical shape centered on a cyclone axis which extends along the first direction and having an end portion on the one side in the first direction blocked; a cyclone inlet portion that communicates between the intake passage portion and the cyclone cylinder unit and has a guide surface extending out from an inner circumferential surface of the cyclone cylinder unit in a tangential direction of the cyclone cylinder unit as viewed in the first direction; and a cyclone outlet portion formed at an end portion of the cyclone cylinder unit on the one side in the first direction and communicating between the cyclone cylinder unit and the filter unit.

According to one or more embodiments of the present invention, there is provided the auxiliary device, wherein the cyclone unit has pluralities of the cyclone cylinder units, the cyclone inlet portions, and the cyclone outlet portions, all equal in number.

According to one or more embodiments of the present invention, there is provided the auxiliary device, wherein the intake passage portion and the cyclone unit are arranged side by side in a second direction intersecting the first direction as viewed in the first direction, and the cyclone unit has a pair of cyclone cylinder units, the pair of cyclone cylinder units being arranged side by side in a third direction intersecting the first direction and the second direction.

According to one or more embodiments of the present invention, there is provided the auxiliary device, wherein a center of the intake passage portion is disposed between the cyclone axes of the pair of cyclone cylinder units in the third direction.

According to one or more embodiments of the present invention, there is provided the auxiliary device, wherein the cyclone cylinder unit includes: a first cylinder unit constituting a portion of the cyclone cylinder unit on the one side in the first direction and having a constant inner diameter; and a second cylinder unit constituting a portion of the cyclone cylinder unit on the other side in the first direction, an inner diameter of the end portion on the one side in the first direction being larger than an inner diameter of an end portion on the other side in the first direction, wherein a gap is formed between the first cylinder unit and the second cylinder unit, and the inner diameter of the end portion of the second cylinder unit on the one side in the first direction is set to be larger than the inner diameter of the first cylinder unit.

According to one or more embodiments of the present invention, there is provided the auxiliary device, wherein the intake passage portion and the cyclone unit are arranged side by side in a second direction intersecting the first direction as viewed in the first direction, the filter is formed in a pleated shape folded in the first direction, and the cyclone outlet portion is disposed on the one side in the second direction with respect to the filter and the outlet is disposed on the other side in the second direction with respect to the filter.

According to one or more embodiments of the present invention, there is provided the auxiliary device, wherein the filter unit overlaps the cyclone unit and the intake passage portion as viewed in the first direction.

According to one or more embodiments of the present invention, there is provided a work machine system including a work machine provided with a motor having a drive shaft, a tip tool which is driven by rotation of the drive shaft, a mechanism unit that drives the tip tool by the rotation of the drive shaft, a housing accommodating the motor and the mechanism unit, having the auxiliary device mounted thereon, and having an intake port to be connected to an outlet of the above auxiliary device, and a fan accommodated in the housing to generate an air flow from a suction port of the auxiliary device toward the intake port by the rotation of the drive shaft.

According to one or more embodiments of the present invention, there is provided the work machine, wherein the housing is configured to include: a main body housing unit accommodating the motor and the mechanism unit; and a handle housing unit extending out from an end portion of the main body housing unit on the one side in the first direction and having a handle unit to be gripped by a worker, wherein the filter unit is located between the cyclone unit and the handle unit in the first direction.

According to one or more embodiments of the present invention, there is provided the work machine, wherein the main body housing unit extends in the first direction.

According to one or more embodiments of the present invention, there is provided the work machine, wherein the fan, the intake port, and filter unit are disposed at positions where they overlap each other in the first direction.

According to one or more embodiments of the present invention, there is provided the work machine, wherein the filter unit is disposed between the fan and the mechanism unit in the first direction.

Advantageous Effects of Invention

According to one or more embodiments of the present invention, it is possible to improve dust collection performance while suppressing an increase in body size.

DESCRIPTION OF EMBODIMENTS

Figure 1:
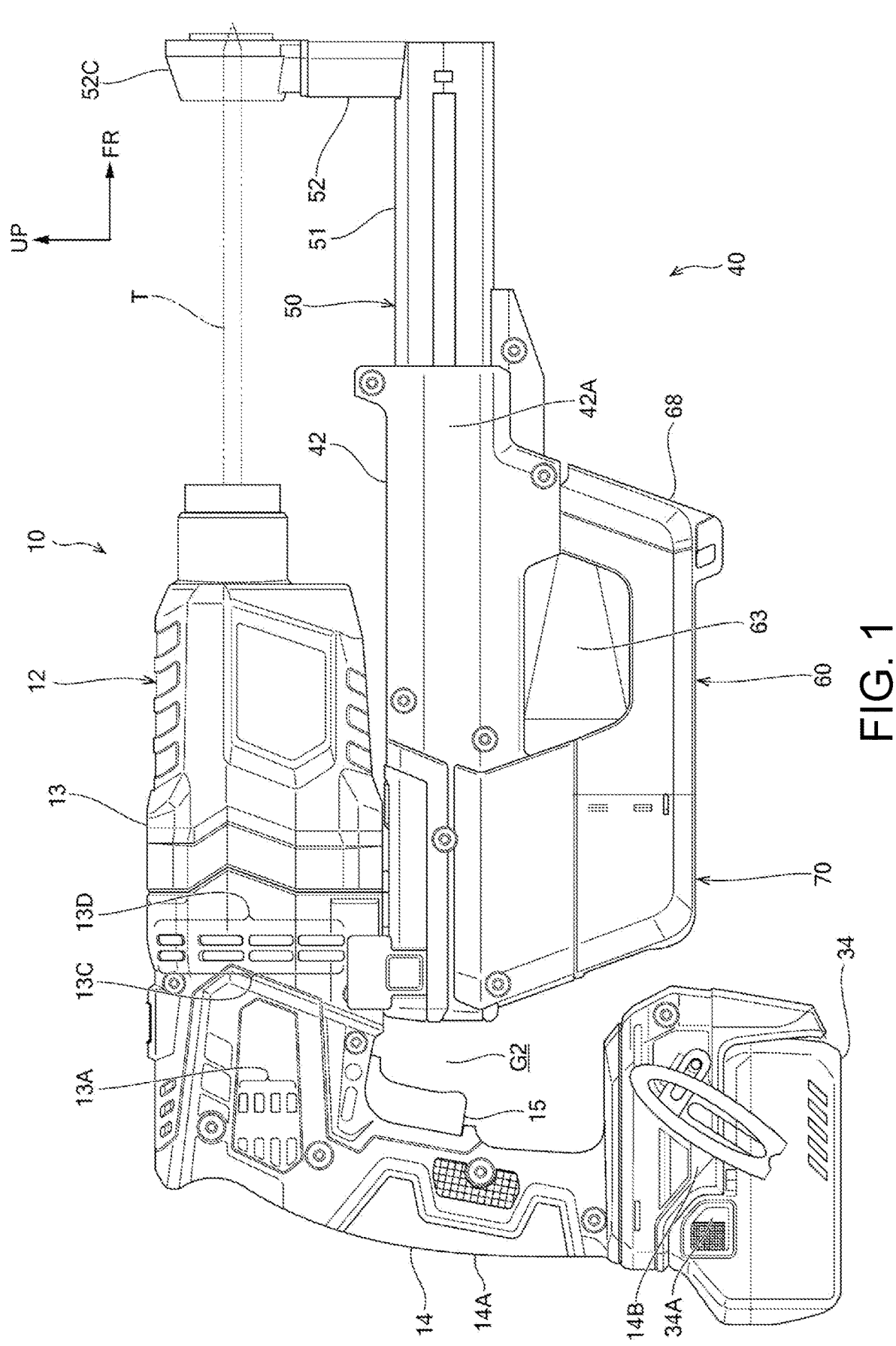
FIG. 1 is a side view from the right side showing a state in which a dust collection device according to the present embodiment is mounted on a hammer drill.

Hereinafter, a dust collection device 40 serving as an "auxiliary device" according to the present embodiment (first embodiment) will be described with reference to the accompanying drawings. As shown in FIG. 1, the dust collection device 40 is configured as a device mounted on a hammer drill 10 serving as a "work machine" to suction air around a tip tool T mounted on the hammer drill 10.

Meanwhile, arrows UP, FR, and RH which are appropriately shown in the drawings indicate the upper side, front side, and right side of the hammer drill 10 and the dust collection device 40. In the following description, when vertical, front-rear, and left-right directions are used, the vertical direction, front-rear direction, and left-right direction of the hammer drill 10 and the dust collection device 40 are indicated unless otherwise specified. The front-rear direction corresponds to a first direction in the present invention, the vertical direction corresponds to a second direction in the present invention, and the left-right direction corresponds to a third direction in the present invention. Hereinafter, the hammer drill 10 will be first described, and then the dust collection device 40 will be described.

Figure 2:
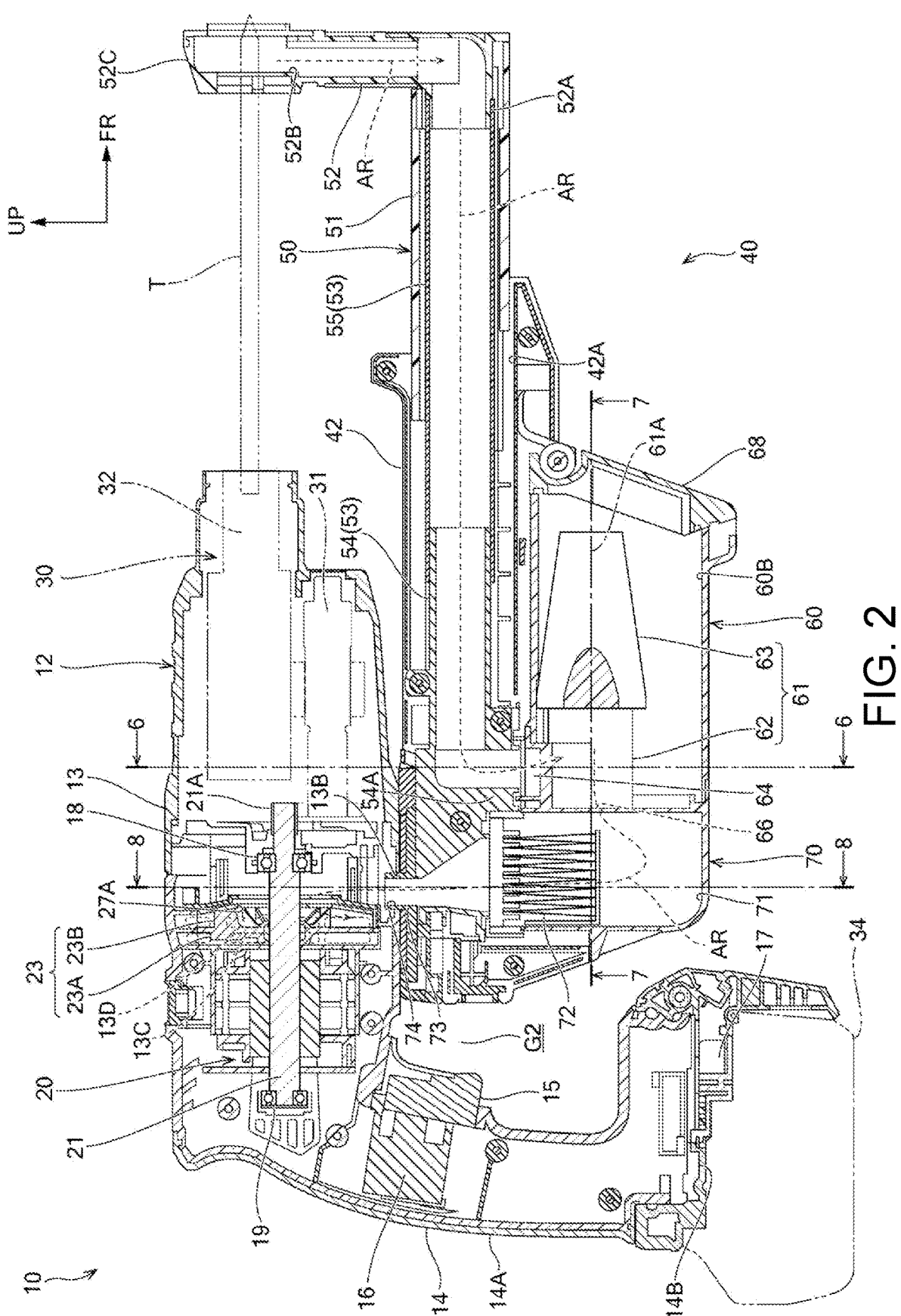
FIG. 2 is a longitudinal cross-sectional view showing the inside of the hammer drill and the dust collection device shown in FIG. 1.

(Hammer drill 10) The hammer drill 10 is configured as a tool for performing drilling or the like on a workpiece. As shown in FIGS. 1 and 2, the hammer drill 10 is configured to include a housing 12, a motor 20, a drive mechanism unit 30 serving as a "mechanism unit" which is driven by the driving force of the motor 20, and a battery pack 34. Hereinafter, each component of the hammer drill 10 will be described.

(Housing 12) The housing 12 is formed in a hollow and substantially inverted L shape in a side view from the right side. Specifically, the housing 12 is configured to include a main body housing unit 13 extending in the front-rear direction and a handle housing unit 14 extending out and downward from the rear end portion (end portion on one side in the front-rear direction) of the main body housing unit 13.

A plurality of (four in the present embodiment) first drill-side intake ports 13A is formed through the right and left sidewalls of the rear end portion of the main body housing unit 13. The first drill-side intake ports 13A are formed in an elongated hole shape with the front-rear direction as a longitudinal direction, and are arranged side by side in the vertical direction. In addition, a second drill-side intake port 13B (see FIGS. 2 and 8) serving as an "intake port" is formed through the lower wall of the intermediate portion of the main body housing unit 13 in the front-rear direction, and the second drill-side intake port 13B is formed in a substantially rectangular shape.

In addition, a plurality of (four in the present embodiment) first drill-side exhaust ports 13C is formed through the right wall of the intermediate portion of the main body housing unit 13 in the front-rear direction. The first drill-side exhaust ports 13C are formed in an elongated hole shape with the front-rear direction as a longitudinal direction, and are arranged side by side in the vertical direction. In addition, a plurality of (four in the present embodiment) second drill-side exhaust ports 13D (in a broad sense, elements understood as "exhaust ports") is formed through the front side of the first drill-side exhaust port 13C in the main body housing unit 13. The second drill-side exhaust ports 13D are formed in an elongated hole shape with the front-rear direction as a longitudinal direction, and are arranged side by side in the vertical direction. Further, the second drill-side exhaust ports 13D are disposed slightly behind the second drill-side intake port 13B.

The upper portion of the handle housing unit 14 is configured as a handle unit 14A which is gripped by a user. A trigger 15 is provided at the upper end portion of the handle unit 14A. The trigger 15 protrudes forward from the handle unit 14A and is configured to be capable of being pulled rearward. A switch mechanism 16 is provided on the rear side of the trigger 15. The switch mechanism 16 has a switch (not shown) which is operated by the trigger 15. The switch is electrically connected to a control unit (not shown)

of the hammer drill and is configured to output an output signal according to the operating state of the trigger 15 to the control unit.

The lower end portion of the handle housing unit 14 is configured as a battery mounting portion 14B for mounting the battery pack 34 to be described later. The battery mounting portion 14B protrudes forward from the lower end portion of the handle housing unit 14 and is bent downward. In addition, the battery mounting portion 14B is provided with a connector 17 which is connected to the battery pack 34.

(Motor 20) The motor 20 is configured as a three-phase brushless motor, is accommodated in the rear portion of the main body housing unit 13, and is electrically connected to the control unit. The motor 20 has a drive shaft 21 with the front-rear direction as an axial direction. The front-end-side portion of the drive shaft 21 is rotatably supported by a front-side bearing 18 fixed to the main body housing unit 13, and the rear end portion of the drive shaft 21 is rotatably supported by a rear-side bearing 19 fixed to the main body housing unit 13. In addition, a pinion gear 21A is formed at the front end portion of the drive shaft 21.

Figure 3:
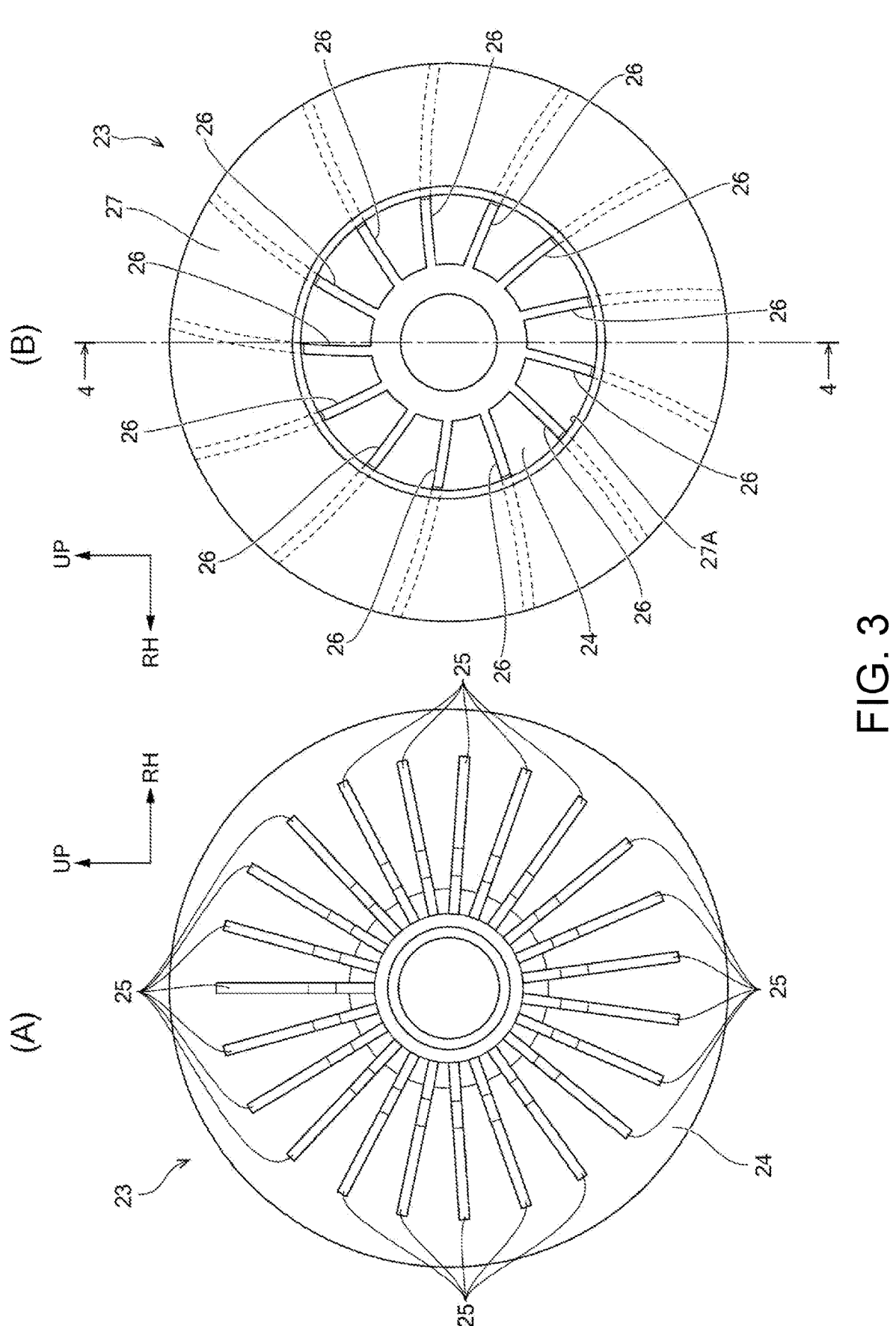
In FIG. 3, (A) is a rear view from the rear side showing a fan of the hammer drill shown in FIG. 2, and (B) is a front view from the front side of the fan in (A) of FIG. 3.
Figure 4:
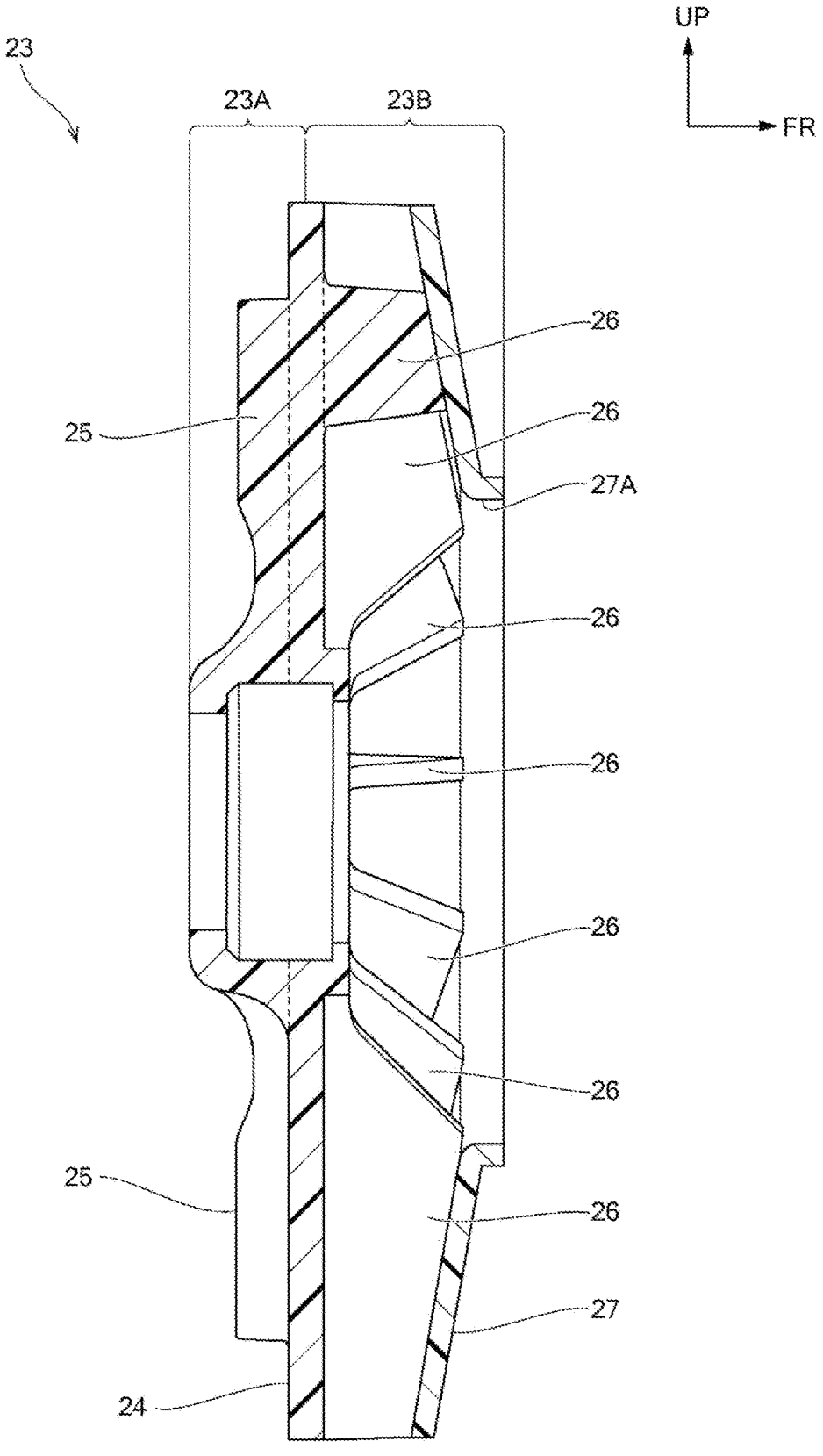
FIG. 4 is a cross-sectional side view of the fan shown in (B) of FIG. 3 (a cross-sectional view along line 4-4 in (B) of FIG. 3).
Figure 8:
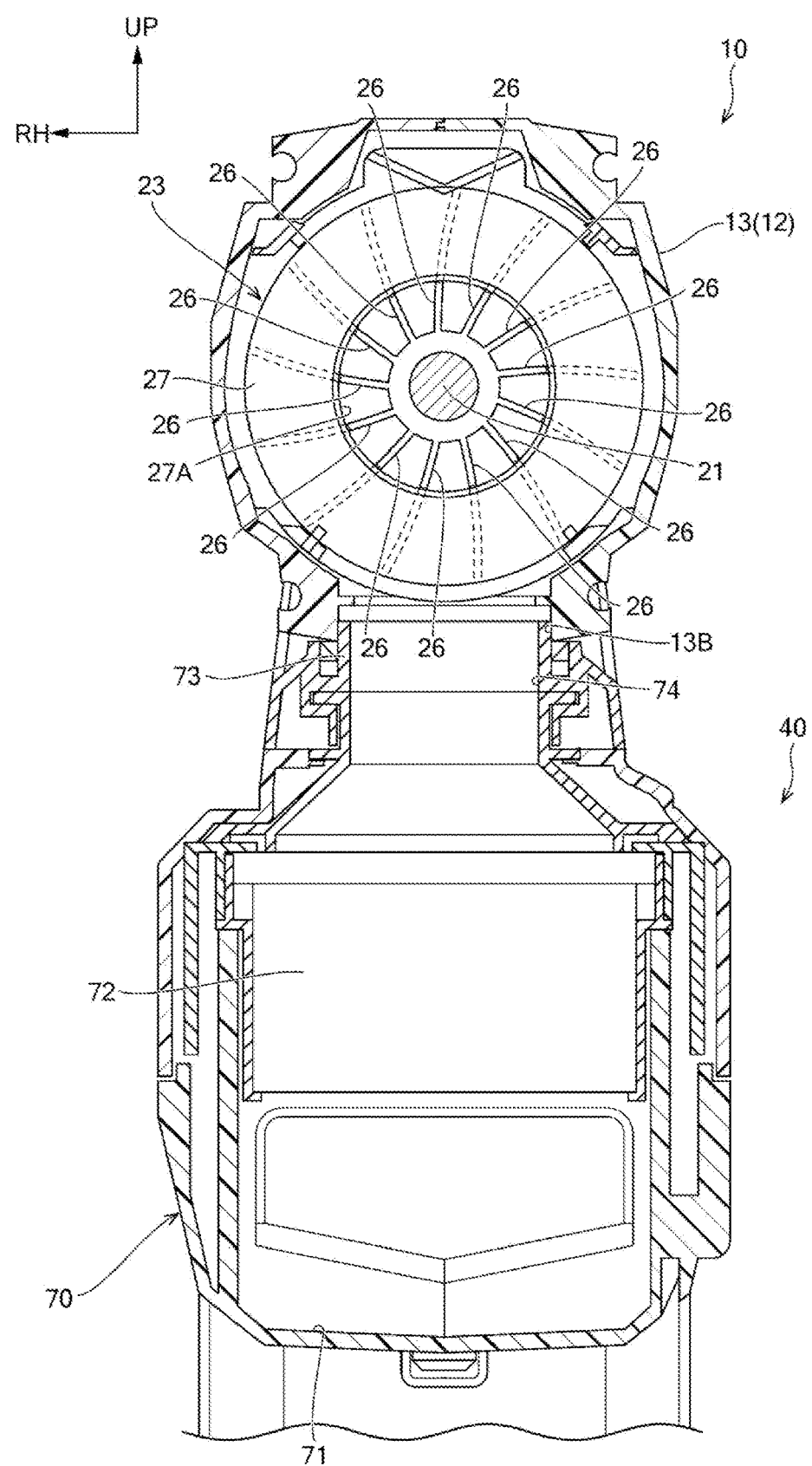
FIG. 8 is a cross-sectional view from the front side showing a fan unit of the dust collection device shown in FIG. 2 (a cross-sectional view along line 8-8 in FIG. 2).

As shown in FIG. 2, (A) and (B) of FIG. 3, FIG. 4, and FIG. 8, a fan 23 is integrally rotatably provided at the front-end-side portion of the drive shaft 21. The fan 23 is formed as a whole in a disc shape with the front-rear direction as a thickness direction. The fan 23 is configured to include a first fan unit 23A constituting a rear portion of the fan 23 and a second fan unit 23B constituting a front portion of the fan 23, and the first fan unit 23A and the second fan unit 23B are configured as a centrifugal fan.

The first fan unit 23A is configured to include a base plate 24 and a plurality of first fins 25. The base plate 24 is formed in a substantially annular plate shape with the front-rear direction as a plate thickness direction. The first fins 25 are formed on the rear surface of the base plate 24 and extend in the radial direction of the base plate 24. In addition, the plurality of first fins 25 is disposed at predetermined angular intervals in the circumferential direction of the base plate 24. Further, the first drill-side exhaust port 13C of the housing 12 is disposed radially outside of the fan 23 with respect to the first fins 25. When the fan 23 rotates together with the drive shaft 21, the first fins 25 generate an air flow that flows radially outward from the fan 23. Thereby, the motor 20 is cooled by the first fan unit 23A that causes air to flow from the first drill-side intake port 13A into the main body housing unit 13 and causes the air to flow out from the first drill-side exhaust port 13C.

The second fan unit 23B is configured to include the base plate 24, a plurality of second fins 26, and a fan cover 27. That is, the base plate 24 is configured as a common portion of the first fan unit 23A and the second fan unit 23B. The second fins 26 are formed on the front surface of the base plate 24 and extend in the radial direction of the base plate 24. In addition, the plurality of second fins 26 is disposed at predetermined angular intervals in the circumferential direction of the base plate 24. Further, the second drill-side exhaust ports 13D of the housing 12 are disposed radially outside of the fan 23 with respect to the second fins 26.

The fan cover 27 is formed in a substantially annular plate shape and is connected to the front end portions of the second fins 26. The fan cover 27 is slightly inclined forward as it goes radially inward in a side view. In addition, the central opening of the fan cover 27 is configured as a fan intake port 27A, and the inner diameter of the fan intake port 27A is set to be larger than the diameter of the drive shaft 21. The front end portion of the fan cover 27 is disposed on the upper side of the second drill-side intake port 13B of the housing 12. That is, the front end portion of the fan cover 27 and the second drill-side intake port 13B overlap each other in a plan view. In other words, the second fan unit 23B and the second drill-side intake port 13B are disposed at positions where they overlap each other in the front-rear direction.

When the fan 23 rotates together with the drive shaft 21, air flows from the fan intake port 27A of the second fan unit 23B into the second fan unit 23B, and the second fins 26 allow the inflow air to flow radially outward from the fan 23. Thereby, the second fan unit 23B is configured to generate an air flow AR that flows from the second drill-side intake port 13B of the housing 12 into the main body housing unit 13. The air flow AR passes through the inside of the second fan unit 23B and is exhausted from the second drill-side exhaust ports 13D.

(Drive mechanism unit 30) As shown in FIG. 2, the drive mechanism unit 30 is configured as a mechanism unit that transmits the rotational force of the motor 20 to the tip tool T to drive the tip tool T. The drive mechanism unit 30 is accommodated in the front end portion of the main body housing unit 13. Specifically, the drive mechanism unit 30 is disposed on the front side of the fan 23. The drive mechanism unit 30 is configured to include an intermediate shaft 31 and a transmission unit 32.

The intermediate shaft 31 is formed in a substantially columnar shape with the front-rear direction as an axial direction, and is rotatably supported by a bearing (not shown) fixed to the main body housing unit 13. A gear (not shown) is integrally rotatably provided at the rear end portion of the intermediate shaft 31, and the gear is meshed with the pinion gear 21A of the drive shaft 21. Thereby, the motor 20 is driven and the drive shaft 21 rotates, so that the intermediate shaft 31 rotates around its own axis. The intermediate shaft 31 is provided with a motion conversion member (not shown), and the motion conversion member converts the rotational motion of the intermediate shaft 31 into a reciprocating motion in the front-rear direction and transmits the converted motion to the transmission unit 32 to be described later.

The transmission unit 32 extends in the front-rear direction on the upper side of the intermediate shaft 31. The tip tool T is held at the front end portion of the transmission unit 32. The tip tool T is formed in a substantially columnar shape with the front-rear direction as an axial direction, and the rear end portion of the tip tool T is held by the transmission unit 32. In addition, the transmission unit 32 is connected to the intermediate shaft 31. Thereby, the rotational force of the motor 20 is transmitted to the tip tool T, and the tip tool T rotates around its own axis to perform drilling on a workpiece.

(Battery pack 34) The battery pack 34 is formed in a substantially rectangular parallelepiped shape. The battery pack 34 is mounted on the battery mounting portion 14B of the handle housing unit 14 from the rear side. The battery pack 34 has a connector (not shown), and is configured such that, in a state where the battery pack 34 is mounted on the battery mounting portion 14B, the connector is connected to the connector 17 and electric power is supplied from the battery pack 34 to the motor 20. In addition, the battery pack 34 has a pair of lock members 34A, and the lock members 34A are provided on the right and left side portions of the battery pack 34. In a state where the battery pack 34 is mounted on the battery mounting portion 14B, the lock members 34A are engaged with the handle housing unit 14 to restrict rearward movement of the battery pack 34.

Figure 5:
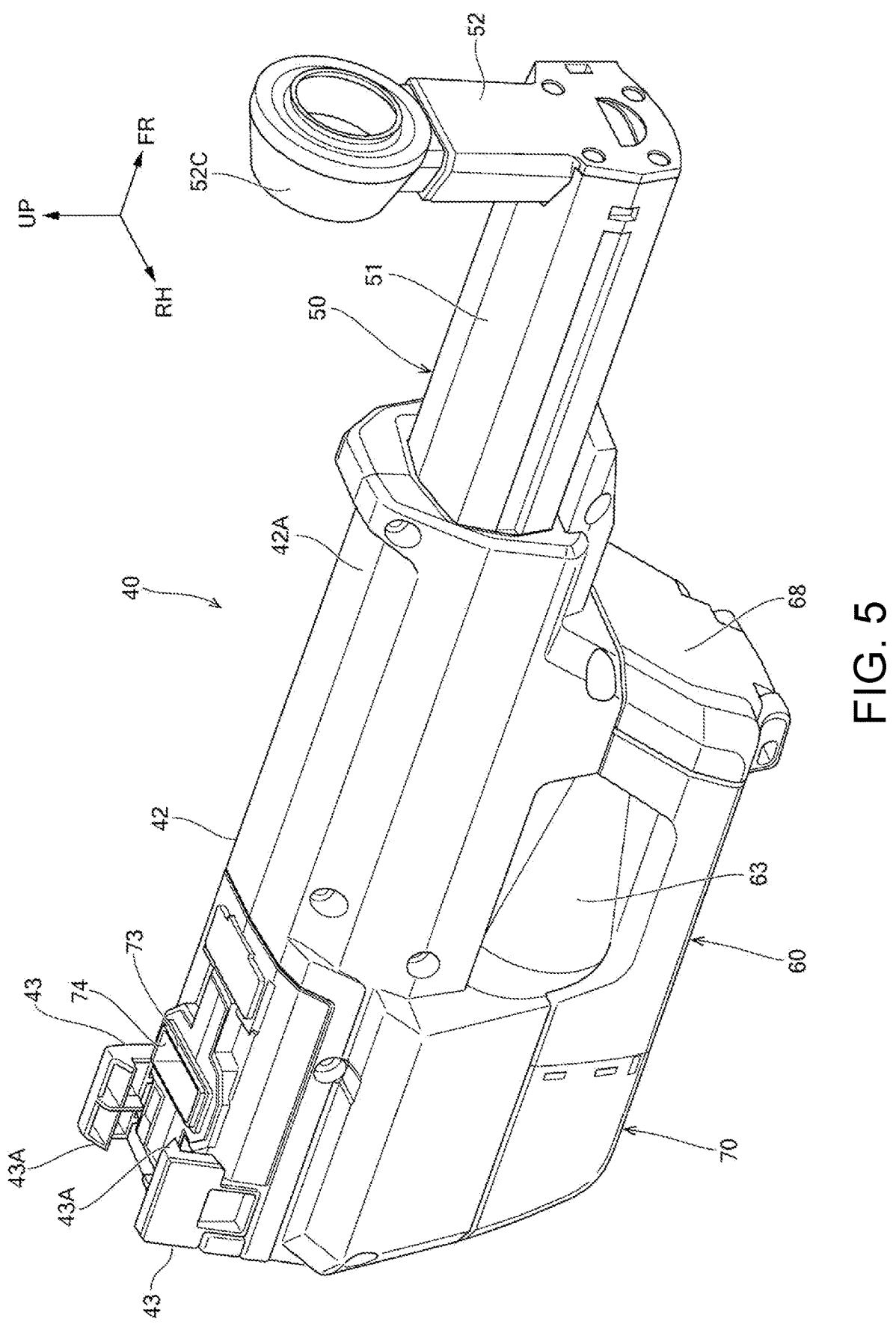
FIG. 5 is a perspective view from the right oblique front of the dust collection device shown in FIG. 1.

(Dust Collection Device 40) FIGS. 1, 2, and 5

As shown in FIG. 8, the dust collection device 40 is mounted on the main body housing unit 13 of the hammer drill 10 and is disposed on the lower side of the main body housing unit 13. In addition, although the details will be described later, the inside of the dust collection device 40 and the inside of the main body housing unit 13 communicate with each other through the second drill-side intake port 13B, and thus the air flow AR generated by the second fan unit 23B of the fan 23 causes air in the dust collection device 40 to flow from the second drill-side intake port 13B into the main body housing unit 13. More specifically, the air flow AR causes air and dust around the tip tool T to be suctioned into the dust collection device 40, separates the suctioned air and dust in the dust collection device 40, and causes the separated air to flow out from the second drill-side exhaust ports 13D into the main body housing unit 13.

The dust collection device 40 extends in the front-rear direction as a whole and is disposed adjacent to the lower side of the main body housing unit 13. The dust collection device 40 is configured to include a dust collection housing 42, an air inflow unit 50, a cyclone unit 60, and a filter unit 70. Hereinafter, each component of the dust collection device 40 will be described.

(Dust collection housing 42) The dust collection housing 42 constitutes an upper outer shell of the dust collection device 40. The dust collection housing 42 is formed in a substantially box-like shape that opens downward. A pair of right and left connection members 43 (see FIG. 5) are provided at the upper rear end portion of the dust collection housing 42. The connection member 43 is rotatably connected to the dust collection housing 42 with the front-rear direction as an axial direction, and a hook portion 43A is formed at the upper end portion of the connection member 43. The dust collection device 40 is disposed adjacent to the lower side of the main body housing unit 13, the hook portion 43A is engaged with the main body housing unit 13, and the dust collection housing 42 (that is, the dust collection device 40) is mounted on the hammer drill 10. A support cylinder unit 42A in a cylindrical shape with the front-rear direction as an axial direction is formed at the front portion of the dust collection housing 42, and the support cylinder unit 42A is disposed further forward than the main body housing unit 13 of the hammer drill 10.

(Air inflow unit 50) The air inflow unit 50 is configured as a mechanism unit that allows the air around the tip tool T to flow in and the air to flow out to the cyclone unit 60 to be described later. The air inflow unit 50 constitutes a front upper portion of the dust collection device 40. The air inflow unit 50 is configured to include a slide arm 51, a suction unit 52, and an intake pipe 53 serving as an "intake passage portion."

The slide arm 51 is formed in a cylindrical shape with the front-rear direction as an axial direction. The slide arm 51 is connected to the support cylinder unit 42A of the dust collection housing 42 so as to be slidable in the front-rear direction, and the front end portion of the slide arm 51 protrudes further forward than the support cylinder unit 42A.

The suction unit 52 is formed in a cylindrical shape with the vertical direction as an axial direction, and the lower end portion of the suction unit 52 is connected to the front end portion of the slide arm 51 by claw fitting or the like. A connection cylinder unit 52A is formed at the lower end portion of the suction unit 52, and the connection cylinder unit 52A is formed in a substantially cylindrical shape with the front-rear direction as an axial direction, protrudes rearward from the suction unit 52, and is disposed inside the front end portion of the slide arm 51. In addition, the inside of the connection cylinder unit 52A and the inside of the suction unit 52 communicate with each other.

An upper opening of the suction unit 52 is configured as a suction port 52B. In addition, a tool insertion portion 52C is formed at the upper end portion of the suction unit 52. The tool insertion portion 52C is formed in a substantially cylindrical shape with the front-rear direction as an axial direction, and the suction port 52B opens radially inward from the tool insertion portion 52C. The tip portion of the tip tool T is inserted into the tool insertion portion 52C. Thereby, the suction port 52B causes the air around the tip tool T to flow into the suction unit 52.

The intake pipe 53 is configured to include a rear intake pipe 54 constituting a rear portion of the intake pipe 53 and a front intake pipe 55 constituting a front portion of the intake pipe 53. The rear intake pipe 54 is formed in a substantially cylindrical shape with the front-rear direction as an axial direction. The rear intake pipe 54 is accommodated in the support cylinder unit 42A of the dust collection housing 42 and is fixed to the dust collection housing 42. That is, the rear intake pipe 54 is disposed on the lower side of the front portion of the main body housing unit 13. A pipe outlet portion 54A protruding downward is formed at the rear end portion of the rear intake pipe 54. The pipe outlet portion 54A is formed in a substantially rectangular cylindrical shape, and the inside of the rear intake pipe 54 and the inside of the pipe outlet portion 54A communicate with each other.

The front intake pipe 55 is formed in a substantially cylindrical shape with the front-rear direction as an axial direction. The front intake pipe 55 is disposed coaxially with the rear intake pipe 54 on the front side of the rear intake pipe 54, and the rear end portion of the front intake pipe 55 is externally mounted on the front end portion of the rear intake pipe 54. The front intake pipe 55 is formed of a stretchable rubber material or the like and is configured to be stretchable in the front-rear direction. Thereby, the intake pipe 53 including the front intake pipe 55 is configured to be stretchable in the front-rear direction. The front end portion of the front intake pipe 55 is externally inserted into the connection cylinder unit 52A of the suction unit 52. Thus, air suctioned from the suction port 52B into the suction unit 52 flows rearward through the intake pipe 53 and flows out downward from the pipe outlet portion 54A.

(Cyclone unit 60) The cyclone unit 60 is formed in a substantially rectangular parallelepiped box shape that opens forward and is disposed on the lower side of the rear intake pipe 54. That is, the cyclone unit 60 and the intake pipe 53 are disposed at positions where they overlap each other in the front-rear direction. In other words, the cyclone unit 60 and the intake pipe 53 are arranged side by side in the vertical direction. In addition, the cyclone unit 60 is disposed further upward than the lower surface of the battery pack 34.

A lid unit 68 is openably provided at the front end portion of the cyclone unit 60. The lid unit 68 is formed in a substantially rectangular plate shape with the front-rear direction as a plate thickness direction, and the upper end portion of the lid unit 68 is rotatably connected to the cyclone unit 60 with the left-right direction as an axial direction. In addition, the lower end portion of the lid unit 68 is locked to the cyclone unit 60. Thereby, a front opening of the cyclone unit 60 is blocked by the lid unit 68. In addition, the cyclone unit 60 has a pair of right and left cyclone cylinder units 61, a pair of right and left cyclone inlet portions 64, and a pair of right and left cyclone exhaust cylinder units 65.

(Cyclone cylinder unit 61) The pair of cyclone cylinder units 61 are disposed inside the cyclone unit 60 and are disposed at positions symmetrical with respect to the center of the dust collection device 40 in the left-right direction. Specifically, the above-described intake pipe 53 (the central line thereof) is disposed between the pair of cyclone cylinder units 61 in a plan view. The cyclone cylinder unit 61 is formed as a whole in a substantially cylindrical shape with the front-rear direction as an axial direction, and the central axis of the cyclone cylinder unit 61 is a cyclone axis 61A. In addition, the cyclone cylinder unit 61 is configured to include a rear cylinder unit 62 serving as a "first cylinder unit" constituting a rear portion of the cyclone cylinder unit 61 and a front cylinder unit 63 serving as a "second cylinder unit" constituting a front portion of the cyclone cylinder unit 61.

The rear cylinder unit 62 is formed in a cylindrical shape centered on the cyclone axis 61A and protrudes forward from the rear wall of the cyclone unit 60. In other words, the rear cylinder unit 62 is formed in a bottomed cylindrical shape in which the end portion on the rear side (one side in the axial direction) is blocked and opens forward. In addition, the inner diameter of the rear cylinder unit 62 is set to be constant in the front-rear direction. That is, the inner circumferential surface of the rear cylinder unit 62 is disposed parallel to the cyclone axis 61A.

The front cylinder unit 63 is formed in a substantially conical cylindrical shape centered on the cyclone axis 61A and is disposed on the front side of the rear cylinder unit 62. A portion of the front cylinder unit 63 constitutes a portion of right and left sidewalls of the cyclone unit 60. The sidewall of the front cylinder unit 63 is inclined radially inward toward the front side. That is, the inner circumferential surface of the front cylinder unit 63 is inclined in a direction approaching the cyclone axis 61A toward the front side. In other words, the inner diameter of the rear end portion of the front cylinder unit 63 is set to be larger than the inner diameter of the front end portion of the front cylinder unit 63.

In addition, the inner diameter of the rear end portion of the front cylinder unit 63 is set to be larger than the inner diameter of the rear cylinder unit 62, and the front end portion of the rear cylinder unit 62 is disposed inside the rear end portion of the front cylinder unit 63. That is, the front end portion of the rear cylinder unit 62 and the rear end portion of the front cylinder unit 63 overlap each other in the front-rear direction, and a gap G1 is formed between the front end portion of the rear cylinder unit 62 and the rear end portion of the front cylinder unit 63. Further, the rear end portions of a pair of right and left front cylinder units 63 are connected to each other at the central portion of the dust collection device 40 in the left-right direction. The inside of the cyclone cylinder unit 61 is configured as a cyclone chamber 60A, and the lower portion of the cyclone cylinder unit 61 inside the cyclone unit 60 is configured as a dust collection chamber 60B.

(Cyclone inlet portion 64) Each cyclone inlet portion 64 is provided in a pair of right and left rear cylinder units 62. The cyclone inlet portion 64 is formed in a substantially rectangular cylindrical shape with the vertical direction as an axial direction, extends out and upward from the rear cylinder unit 62, and is disposed adjacent to the lower side of the pipe outlet portion 54A of the rear intake pipe 54. Specifically, the cyclone inlet portion 64 extends out and upward from a portion of the rear cylinder unit 62 on the inner side in the left-right direction (the central side of the dust collection device 40 in the left-right direction), and the inside of the rear cylinder unit 62 and the inside of the cyclone inlet portion 64 communicate with each other. That is, the rear cylinder unit 62 is disposed at a position shifted to the central side of the dust collection device 40 in the left-right direction with respect to the cyclone axis 61A. Thereby, the intake pipe 53 and the cyclone unit 60 are connected to each other.

In addition, the sidewall of the rear cylinder unit 62 on the inner side in the left-right direction is configured as a guide wall 64A, and the inner circumferential surface of the guide wall 64A is configured as a guide surface 64B. The guide surface 64B is inclined inward in the left-right direction toward the upper side in a front view from the front side, and the lower end of the guide surface 64B is connected to the inner circumferential surface of the rear cylinder unit 62. Specifically, in a front view, the guide surface 64B extends out and upward from the lower end of the guide surface 64B in the tangential direction of the inner circumferential surface of the rear cylinder unit 62.

Thereby, air having flowed from the pipe outlet portion 54A into the cyclone inlet portion 64 flows into the rear cylinder unit 62 along the guide surface 64B. That is, the air having flowed into the rear cylinder unit 62 flows forward while swirling along the inner circumferential surface of the rear cylinder unit 62. In addition, the air having flowed out from the front end portion of the rear cylinder unit 62 into the front cylinder unit 63 flows forward while swirling along the inner circumferential surface of the front cylinder unit 63. Thereby, air and dust are separated from each other in the cyclone chamber 60A, and the dust is discharged from the front-end opening of the front cylinder unit 63 and accumulated on the lower surface of the dust collection chamber 60B. Meanwhile, at the pair of right and left cyclone inlet portions 64, the upper ends of the guide wall 64A are connected to each other.

(Cyclone exhaust cylinder unit 65) Each cyclone exhaust cylinder unit 65 is provided inside the pair of rear cylinder units 62. The cyclone exhaust cylinder unit 65 is formed in a cylindrical shape centered on the cyclone axis 61A and protrudes forward from the rear wall of the cyclone unit 60. In addition, the cyclone exhaust cylinder unit 65 penetrates in the front-rear direction. Thereby, a cyclone outlet hole 66 serving as a "cyclone outlet portion" is formed at the rear end portion of the cyclone exhaust cylinder unit 65, and the inside of the cyclone unit 60 (the cyclone chamber 60A) and the inside of the filter unit 70 to be described later communicate with each other through the cyclone outlet hole 66. The air from which the dust has been separated flows rearward through the central portion of the cyclone cylinder unit 61, flows rearward through the cyclone exhaust cylinder unit 65, and flows out to the filter unit 70 to be described later.

(Filter unit 70) The filter unit 70 is formed in a substantially rectangular box shape with the vertical direction as a longitudinal direction and is disposed on the rear side of the intake pipe 53 of the air inflow unit 50 and the cyclone unit 60. That is, the filter unit 70 is disposed between the handle unit 14A of the hammer drill 10 and the intake pipe 53 and the cyclone unit 60. Further, the filter unit 70, the intake pipe 53, and the cyclone unit 60 overlap each other in a front view.

The inside of the filter unit 70 is configured as a filter chamber 71. The front wall of the filter unit 70 and the rear wall of the cyclone unit 60 are configured as a common wall portion. That is, the inside of the cyclone unit 60 (the cyclone chamber 60A) and the filter chamber 71 communicate with each other through the cyclone outlet hole 66 described above. Thereby, the air having flowed out from the cyclone unit 60 flows into the filter chamber 71.

A filter 72 is provided at the intermediate portion of the filter chamber 71 in the vertical direction. The filter 72 is formed in a sheet shape and is folded in a pleated shape. Specifically, the filter 72 is folded in a pleated shape and overlapped in the front-rear direction so that, in a side view, the mountain-folded folds of the filter 72 constitute the upper end portion of the filter 72 and the valley-folded folds of the filter 72 constitute the lower end portion of the filter 72. In addition, a portion (lower end portion) of the filter 72 is disposed further upward than the lower end portion of the cyclone outlet hole 66. Specifically, in a front view, the upper portion of the cyclone outlet hole 66 overlaps the lower end portion of the filter 72, and the lower end portion of the cyclone outlet hole 66 is disposed on the lower side of the filter 72 (one side in the vertical direction). Thus, the wording "a cyclone outlet portion is disposed on one side in a second direction with respect to a filter" in the present invention also includes a case where a portion of the cyclone outlet hole 66 is disposed further downward than the filter 72.

A discharge unit 73 is formed at the upper end portion of the filter chamber 71, and the discharge unit 73 is formed in a rectangular cylindrical shape penetrating in the vertical direction and protrudes upward from the dust collection housing 42. In addition, the upper opening of the discharge unit 73 is configured as an outlet 74. The upper end portion of the discharge unit 73 is fitted into the second drill-side intake port 13B of the hammer drill 10. Thereby, the inside of the main body housing unit 13 of the hammer drill 10 and the inside of the dust collection device 40 communicate with each other through the outlet 74 and the second drill-side intake port 13B. Therefore, air having flowed from the cyclone unit 60 into the filter chamber 71 flows upward and passes through the filter 72. The air having passed through the filter 72 flows from the outlet 74 into the main body housing unit 13.

In addition, the rear end portion of the dust collection housing 42 is disposed further rearward than the filter unit 70. Further, the rear end portion of the dust collection housing 42 is disposed on the front side of the trigger 15 of the handle unit 14A with a gap G2 therebetween. The dimension of the gap G2 in the front-rear direction is set to a predetermined dimension so that the trigger 15 can be pulled by a user's finger which is inserted into the gap G2.

(Operational effect) In the hammer drill 10 configured as described above, when the trigger 15 is pulled, the motor 20 is driven, and the tip tool T rotates around its own axis. This makes it possible to perform drilling on a workpiece. Specifically, the tip tool T is pressed against the workpiece side to perform drilling on the workpiece. In addition, when the motor 20 is driven, the fan 23 rotates together with the drive shaft 21 of the motor 20.

In addition, the dust collection device 40 is mounted on the hammer drill 10, and the dust collection device 40 is disposed on the lower side of the main body housing unit 13 and in the front side of the handle housing unit 14. In a state where the dust collection device 40 is mounted on the hammer drill 10, the upper end portion of the discharge unit 73 of the dust collection device 40 is fitted into the second drill-side intake port 13B of the hammer drill 10, so that the inside of the hammer drill 10 and the inside of the dust collection device 40 communicate with each other. Further, the tip portion of the tip tool T is inserted into the tool insertion portion 52C of the dust collection device 40. During operation of the hammer drill 10, the second fan unit 23B of the fan 23 generates the air flow AR (see FIG. 2) from the dust collection device 40 toward the hammer drill 10. Specifically, the air flow AR that draws the air radially inside the tool insertion portion 52C into the suction unit 52 is generated at the suction port 52B of the dust collection device 40.

Thereby, the air around the tip portion of the tip tool T is suctioned into the dust collection device 40 through the suction port 52B. That is, dust around the tip tool T containing dust generated during drilling flows from the suction port 52B into the suction unit 52 together with the air. Meanwhile, during drilling of a workpiece, the hammer drill 10 approaches the workpiece as the drilling progresses, and the tool insertion portion 52C of the dust collection device 40 comes into contact with the workpiece. Therefore, during drilling of the hammer drill 10, the suction unit 52 is pressed rearward by the workpiece. Thereby, the front intake pipe 55 of the air inflow unit 50 is contracted, and the slide arm 51 and the suction unit 52 are displaced rearward.

Figure 6:
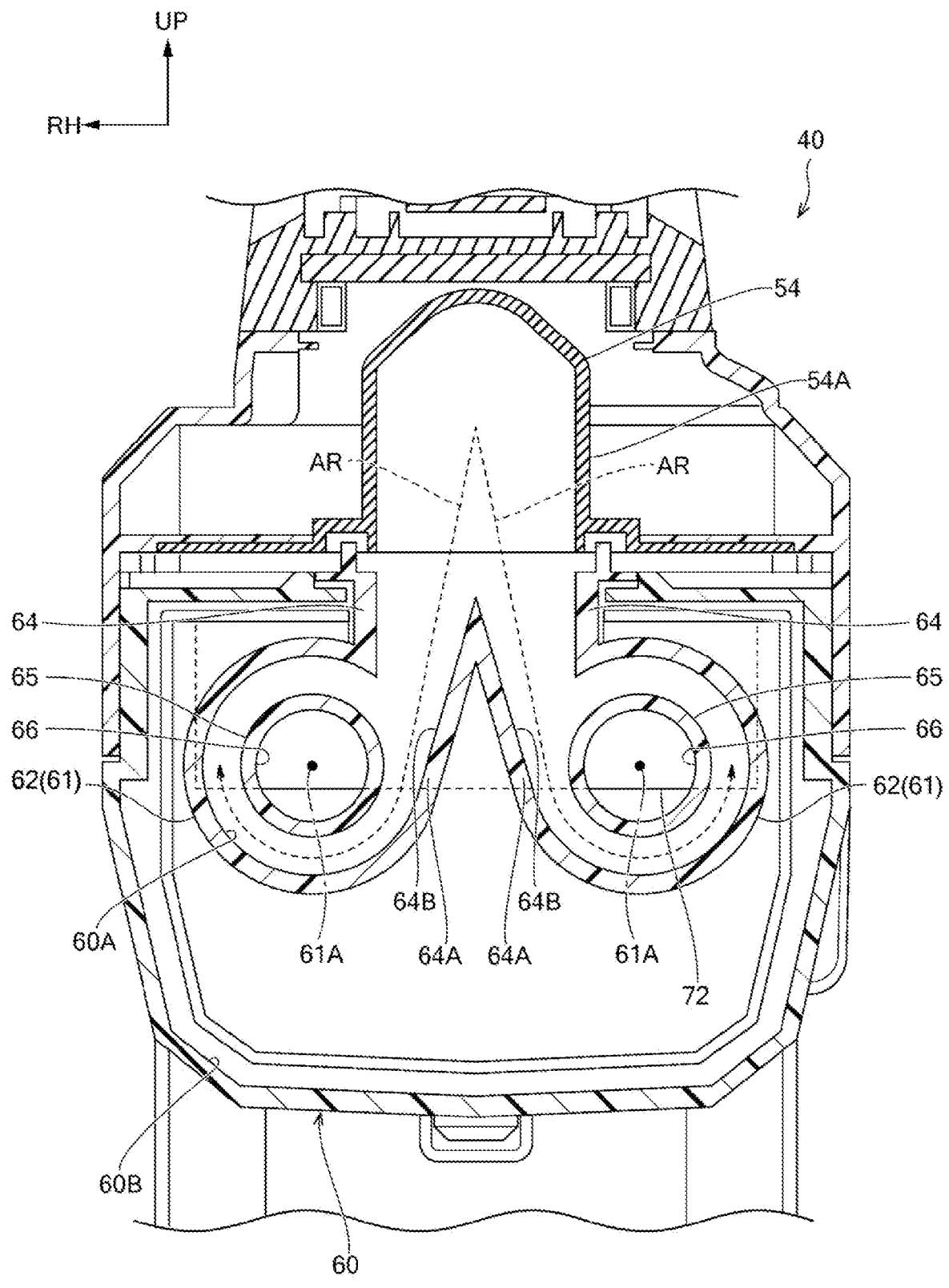
FIG. 6 is a cross-sectional view from the front side showing a cyclone unit of the dust collection device shown in FIG. 2 (a cross-sectional view along line 6-6 in FIG. 2).
Figure 7:
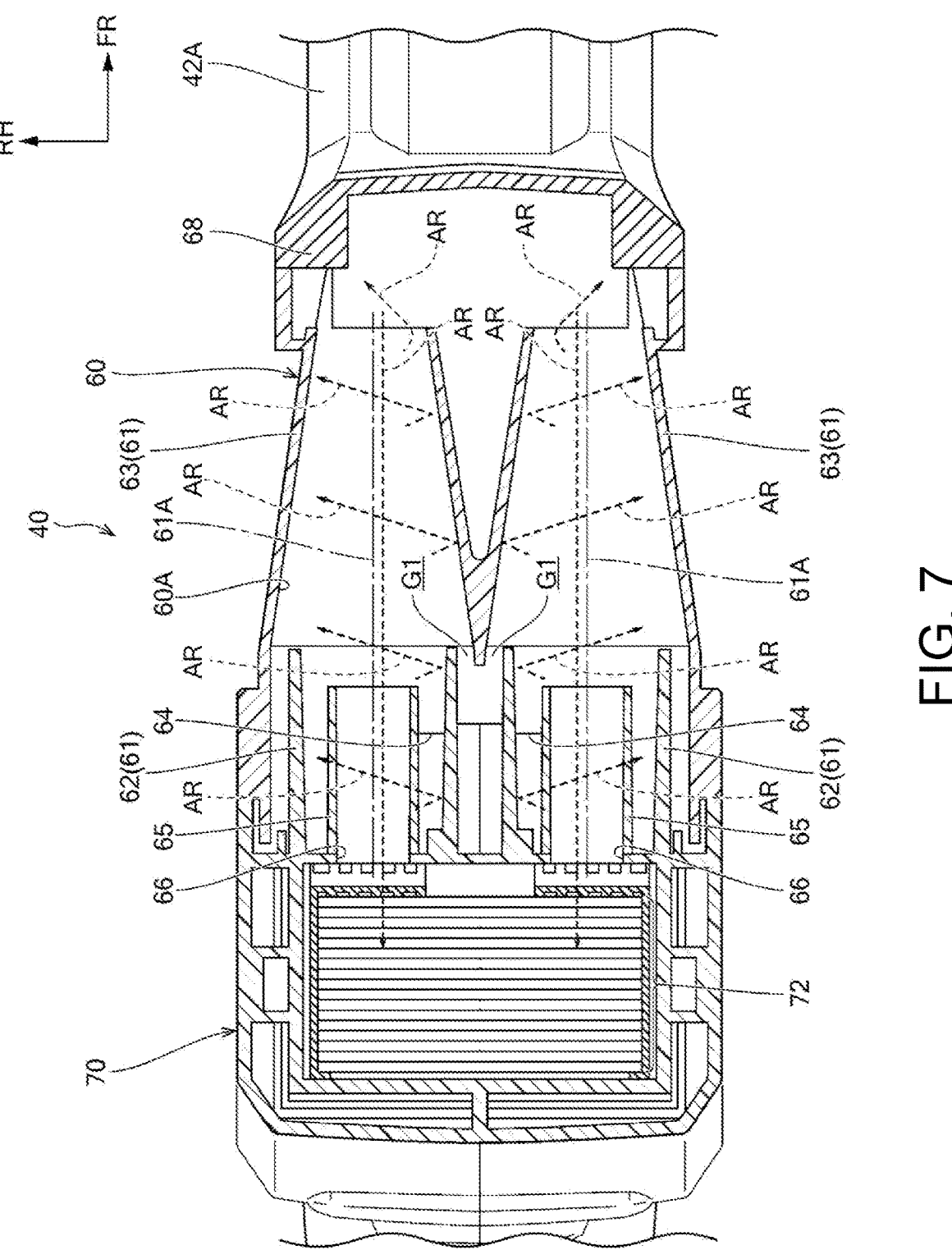
FIG. 7 is a cross-sectional view from the lower side showing the cyclone unit of the dust collection device shown in FIG. 2 (a cross-sectional view along line 7-7 in FIG. 2).

The air flow AR having flowed into the suction unit 52 flows rearward through the intake pipe 53 and flows out downward from the pipe outlet portion 54A. The air flow AR having flowed out downward from the pipe outlet portion 54A flows from the cyclone inlet portion 64 into the rear cylinder unit 62 of the cyclone cylinder unit 61. The air flow AR having flowed into the rear cylinder unit 62 flows forward while swirling around the cyclone axis 61A along the inner circumferential surface of the rear cylinder unit 62, and flows out from the front end portion of the rear cylinder unit 62 into the front cylinder unit 63. The air flow AR having flowed out into the front cylinder unit 63 flows forward while swirling around the cyclone axis 61A along the inner circumferential surface of the front cylinder unit 63 (see the air flow AR in FIGS. 6 and 7). Thereby, air and dust are separated from each other in the cyclone chamber 60A, and the separated dust falls from the front-end opening of the front cylinder unit 63 onto the lower surface of the dust collection chamber 60B. In addition, the air flow AR from which the dust has been separated flows rearward through substantially the central portion of the cyclone cylinder unit 61 and flows into the cyclone exhaust cylinder unit 65 (see the air flow AR in FIG. 7). The air flow AR having flowed into the cyclone exhaust cylinder unit 65 flows from the cyclone outlet hole 66 into the filter chamber 71 of the filter unit 70.

The air flow AR having flowed into the filter chamber 71 flows to the outlet 74 side of the dust collection device 40. That is, in the filter chamber 71, the air flow AR flows upward, passes through the filter 72, and flows to the discharge unit 73 (see the air flow AR in FIG. 2). Thereby, the dust in the air flow AR is removed by the filter 72, and the air flow AR in which the dust has been removed flows from the outlet 74 of the filter unit 70 into the main body housing unit 13.

The air flow AR having flowed into the main body housing unit 13 flows from the fan intake port 27A of the fan 23 into the second fan unit 23B. The second fins 26 then allow the air flow AR to flow radially outward from the fan 23 and be discharged from the second drill-side exhaust ports 13D. As described above, the dust collection device 40 can suction the air around the tip tool T, separate dust contained in the air, and collect the separated dust.

Here, the dust collection device 40 is configured to include the intake pipe 53 connected to the suction unit 52, the cyclone unit 60 that swirls the air having flowed out from the intake pipe 53 to centrifuge the dust, and the filter unit 70 that accommodates the filter 72. The filter unit 70 is connected to the cyclone unit 60 and has the outlet 74 for discharging the air having passed through the filter 72. Therefore, the air and dust around the tip tool T can be separated from each other in the cyclone unit 60. In addition, even when the dust remains in air after passing through the cyclone unit 60, the air passes through the filter 72 of the filter chamber 71, thereby allowing the remaining dust to be removed. Therefore, it is possible to improve the dust collection performance of the dust collection device 40.

In addition, the intake pipe 53 and the cyclone unit 60 are disposed at positions where they overlap each other in a front-rear direction, and the filter unit 70 is disposed on the rear side of the cyclone unit 60 (one side in the front-rear direction). Therefore, for example, as compared to a case where the filter unit 70 is disposed on the lower side of the cyclone unit 60, it is possible to suppress an increase in the body size of the dust collection device 40 in the vertical direction.

In addition, the intake pipe 53 is disposed further forward than the filter unit 70 (the other side in the front-rear direction). That is, the intake pipe 53, the cyclone unit 60, and the filter unit 70 are arranged side by side in the front-rear direction. Thereby, for example, as compared to a case where the filter unit 70 is disposed on the lower side of the intake pipe 53 and the cyclone unit 60, it is possible to further suppress an increase in the body size of the dust collection device 40 in the vertical direction.

In addition, the cyclone unit 60 is configured to include the cyclone cylinder unit 61 centered on the cyclone axis 61A with the front-rear direction as an axial direction, the cyclone inlet portion 64 that communicates between the intake pipe 53 and the cyclone cylinder unit 61, and the cyclone outlet hole 66 that communicates between the cyclone cylinder unit 61 and the filter unit 70. That is, the axial direction of the cyclone cylinder unit 61 and the direction in which the cyclone unit 60 and the filter unit 70 are lined up coincide with each other. Therefore, for example, as compared to a case where the axial direction of the cyclone cylinder unit 61 is a vertical direction, it is possible to suppress an increase in the body size of the dust collection device 40 in the vertical direction.

In addition, the cyclone inlet portion 64 has the guide surface 64B, and in a front view, the guide surface 64B extends out from inner circumferential surface of the cyclone cylinder unit 61 (the rear cylinder unit 62) in the tangential direction of the cyclone cylinder unit 61 (the rear cylinder unit 62). Thereby, the air flow AR flowing into the cyclone cylinder unit 61 flows along the inner circumferential surface of the cyclone cylinder unit 61 (the rear cylinder unit 62) and swirls around the cyclone axis 61A. Therefore, the air and dust in the air flow AR can be effectively separated from each other in the cyclone cylinder unit 61.

In addition, the cyclone unit 60 has the pair of cyclone cylinder units 61, the cyclone inlet portion 64, and the cyclone outlet hole 66. Thereby, the cyclone cylinder unit 61, the cyclone inlet portion 64, and the cyclone outlet hole 66 can effectively separate the dust and air in the air flow AR as compared to one cyclone unit.

In addition, the center of the intake pipe 53 is disposed between the cyclone axes 61A of the pair of right and left cyclone cylinder units 61 in the left-right direction. That is, in a front view, the intake pipe 53 is disposed between the pair of right and left cyclone cylinder units 61. Therefore, it is possible to suppress an increase in the body size of the dust collection device 40 in the left-right direction.

In addition, the cyclone cylinder unit 61 is configured to include the rear cylinder unit 62 constituting the rear portion of the cyclone cylinder unit 61 and the front cylinder unit 63 constituting the front portion of the cyclone cylinder unit 61. The inner diameter of the rear cylinder unit 62 is set to be constant. On the other hand, the inner diameter of the rear end portion of the front cylinder unit 63 is set to be larger than the inner diameter of the front end portion of the front cylinder unit 63, and is set to be larger than the inner diameter of the rear cylinder unit 62. The front end portion of the rear cylinder unit 62 is disposed inside the rear end portion of the front cylinder unit 63, and the gap G1 is formed between the front end portion of the rear cylinder unit 62 and the rear end portion of the front cylinder unit 63. Thereby, even when the posture of the dust collection device 40 changes during work, the dust separated in the cyclone cylinder unit 61 can be accumulated in the dust collection chamber 60B.

That is, when the hammer drill 10 is used, the hammer drill 10 may be used with the tip portion of the tip tool T facing upward. In this case, the cyclone axis 61A is disposed in the vertical direction, and the front cylinder unit 63 is disposed on the upper side of the rear cylinder unit 62. Therefore, the dust separated in the cyclone cylinder unit 61 flows upward along the inner circumferential surface of the cyclone cylinder unit 61 together with the air flow AR, but there is a possibility of the dust not being discharged upward from the tip opening of the front cylinder unit 63 (the cyclone cylinder unit 61). At this time, the dust that has not been discharged from the tip opening of the front cylinder unit 63 falls downward along the inner circumferential surface of the front cylinder unit 63, and falls from the gap G1 to the dust collection chamber 60B side. As a result, the dust that has not been discharged from the tip opening of the front cylinder unit 63 can be accumulated in the dust collection chamber 60B. Therefore, even when the posture of the dust collection device 40 changes during work, the dust separated in the cyclone cylinder unit 61 can be accumulated in the dust collection chamber 60B.

In addition, in the filter unit 70, the lower end portion of the cyclone outlet hole 66 is disposed on the lower side of the filter 72, and the outlet 74 is disposed on the upper side of the filter 72. Thereby, the dust in the air flow AR having flowed out from the cyclone unit 60 to the filter unit 70 is removed by the filter 72, and thus the air flow AR in which the dust has been removed can be caused to flow to the hammer drill 10 side. Further, the filter 72 is formed in a pleated shape which is folded in the front-rear direction. Thereby, the area of the filter 72 can be set to be large while suppressing an increase in the body size of the filter unit 70. That is, it is possible to improve the removal performance of dust in the filter 72 while suppressing an increase in the body size of the filter unit 70.

In addition, in a front view, the upper portion of the cyclone outlet hole 66 overlaps the lower end portion of the filter 72, and the lower end portion of the cyclone outlet hole 66 is disposed on the lower side of the filter 72. Therefore, as compared to a configuration in which the entirety of the cyclone outlet hole 66 is disposed on the lower side of the filter 72, the vertical position of the cyclone cylinder unit 61 can be set on the upper side. Thereby, the cyclone cylinder unit 61 can be disposed at a position close to the intake pipe 53. That is, the vertical lengths of the pipe outlet portion 54A and the cyclone inlet portion 64 can be relatively shortened. Therefore, the air flow AR having flowed from the intake pipe 53 into the cyclone cylinder unit 61 is swirled satisfactorily along the inner circumferential surface of the cyclone cylinder unit 61, and thus the air and dust can be separated from each other in the cyclone chamber 60A.

In addition, the filter unit 70 overlaps the cyclone unit 60 and the intake pipe 53 in a front view. Thereby, it is possible to suppress an increase in the size of the dust collection device 40 in the left-right direction and the vertical direction.

In addition, the housing 12 of the hammer drill 10 is configured to include the main body housing unit 13 extending in the front-rear direction and the handle housing unit 14 extending out and downward from the rear end portion of the main body housing unit 13. The filter unit 70 of the dust collection device 40 is disposed between the handle unit 14A of the handle housing unit 14 and the cyclone unit 60 in the front-rear direction. Thereby, it is possible to dispose the cyclone unit 60 and the filter unit 70 of the dust collection device 40 on a side in a direction in which the handle housing unit 14 extends out with respect to the main body housing unit 13, and to dispose the handle unit 14A, the filter unit 70, and the cyclone unit 60 side by side in a direction in which the main body housing unit 13 extends. Therefore, it is possible to suppress an increase in the body size of the dust collection device 40 in the vertical direction in a state where the dust collection device is mounted on the hammer drill 10.

In addition, the fan 23 of the hammer drill 10, the second drill-side intake port 13B, and the filter unit 70 of the dust collection device 40 are disposed at positions where they overlap each other in the front-rear direction. Specifically, the second drill-side intake port 13B and the filter unit 70 are disposed on the lower side of the second fan unit 23B of the fan 23. Therefore, a passage through which the air flow AR flows can be extended in the vertical direction between the filter unit 70 and the second fan unit 23B. That is, the length of the passage through which the air flow AR flows can be shortened. Thereby, air resistance to the air flow AR can be reduced. Therefore, the air flow AR can be caused to flow efficiently from the filter unit 70 to the hammer drill 10 side and thus be exhausted from the second drill-side exhaust ports 13D.

Meanwhile, in the present embodiment, the inner circumferential surface of the front cylinder unit 63 in the cyclone unit 60 is linearly inclined in a direction approaching the cyclone axis 61A toward the front side in a cross-sectional side view. In other words, the inner circumferential surface of the front cylinder unit 63 is constituted by a single inclined surface. Instead, the inner circumferential surface of the front cylinder unit 63 may be constituted by a plurality of inclined surfaces. In addition, the inner circumferential surface of the front cylinder unit 63 may be curved in an arc shape in a cross-sectional side view.

In addition, although the lower end portion of the cyclone outlet hole 66 is disposed on the lower side of the filter 72 in the present embodiment, the entirety of the cyclone outlet hole 66 may be disposed on the lower side of the filter 72.

Figure 9:
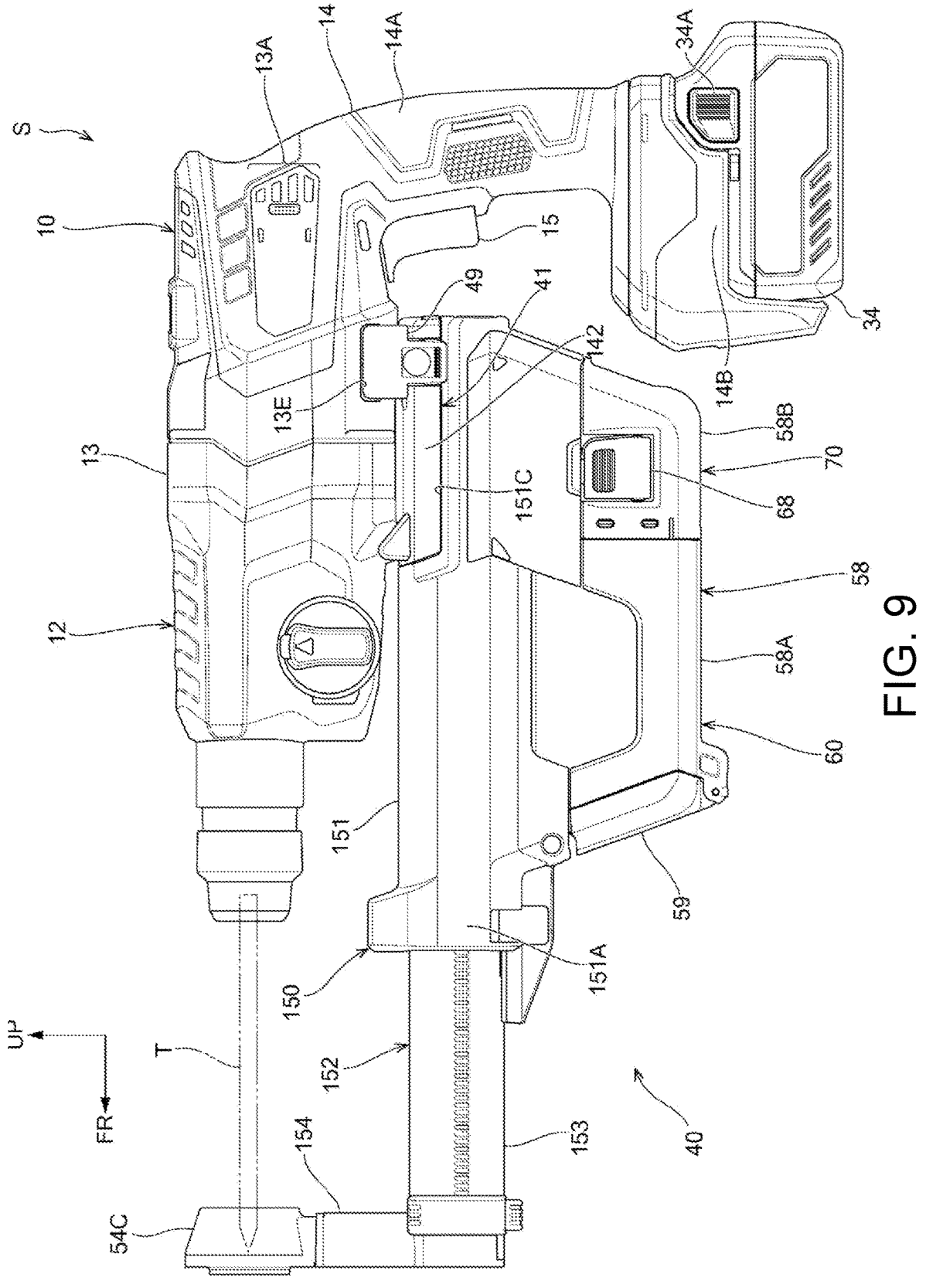
FIG. 9 is a side view from the left side showing a hammer drill system according to a second embodiment.

Hereinafter, a hammer drill system S serving as a work machine system according to a second embodiment will be described with reference to the drawings. The following description of the second embodiment mainly relates to matters that have not been mentioned in the first embodiment, and in addition to partially duplicating the description of the first embodiment, structures for which differences from the first embodiment are not specifically described are common to those of the first embodiment. As shown in FIG. 9, the hammer drill system S is configured to include a hammer drill 10 serving as a work machine and a dust collection device 40 serving as an auxiliary device. The dust collection device 40 is mounted on the hammer drill 10 to suction the air around the tip tool T mounted on the hammer drill 10. Thereby, the dust collection device 40 is configured to collect dust generated during work of the hammer drill 10 in the dust collection device 40.

Figure 10:
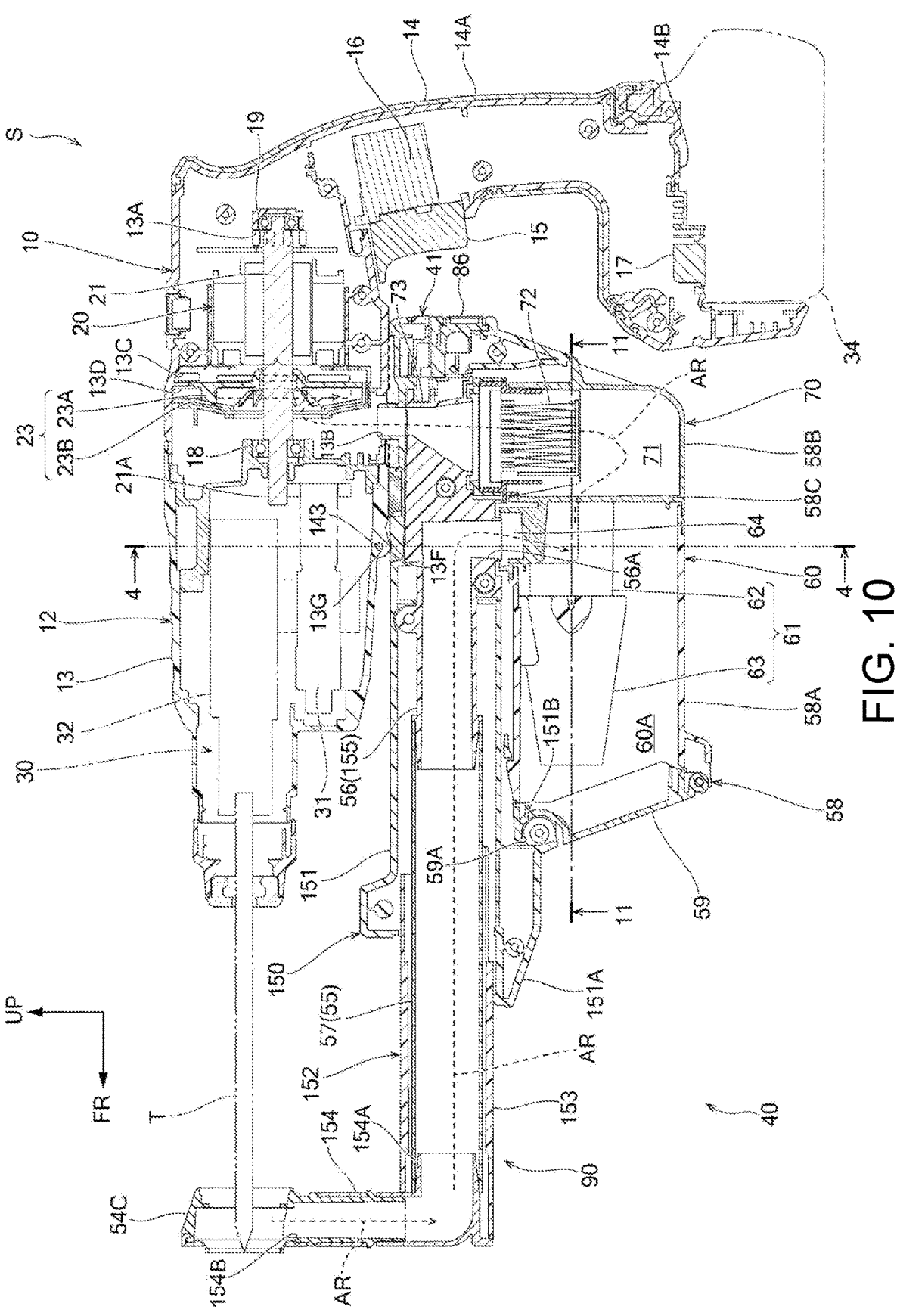
FIG. 10 is a cross-sectional side view from the left side showing the inside of the hammer drill system shown in FIG. 9.

(Hammer drill 10) The hammer drill 10 is a configured as a tool that performs drilling or the like on a workpiece. As shown in FIGS. 9 and 10, the hammer drill 10 is configured to include a housing 12, a motor 20, a drive mechanism unit 30 which is driven by the driving force of the motor 20, and a battery pack 34. Hereinafter, each component of the hammer drill 10 will be described.

(Housing 12) The housing 12 is formed in a hollow and substantially inverted L shape in a side view from the left. Specifically, the housing 12 is configured to include a main body housing 13 extending in the front-rear direction and a handle housing 14 extending out and downward from the rear end portion of the main body housing 13.

A plurality of (four in the second embodiment) rear intake ports 13A is formed through the right and left sidewalls of the rear end portion of the main body housing 13. The rear intake ports 13A are formed in an elongated hole shape with the front-rear direction as a longitudinal direction and are arranged side by side in the vertical direction. In addition, a front intake port 13B (see FIG. 10) serving as an intake port is formed through the lower wall of the intermediate portion of the main body housing 13 in the front-rear direction, and the front intake port 13B is formed in a substantially rectangular shape.

In addition, a plurality of (four in the second embodiment) first exhaust ports 13C (see FIG. 10) is formed through the right wall of the intermediate portion of the main body housing 13 in the front-rear direction (in FIG. 10, for convenience, only the first exhaust port 13C disposed on the uppermost stage is given a reference number). The first exhaust ports 13C are formed in an elongated hole shape with the vertical direction as a longitudinal direction and are arranged side by side in the vertical direction. In addition, second exhaust ports 13D (see FIG. 10) serving as a plurality of (four in the second embodiment) exhaust ports are formed through the main body housing 13 on the front side of the first exhaust port 13C (in FIG. 10, for convenience, only the second exhaust port 13D disposed the uppermost stage is given a reference number). The second exhaust ports 13D are formed in an elongated hole shape with the vertical direction as a longitudinal direction and are arranged side by side in the vertical direction. Further, the second exhaust ports 13D are disposed slightly behind the front intake port 13B.

A locking recess portion 13E (see FIG. 19) for locking an adapter 41 to be described later is formed at the lower end portions of the right and left sidewalls of the main body housing 13 on the rear side of the front intake port 13B. The locking recess portion 13E extends in the front-rear direction and is formed in a recessed shape that opens outward in the left-right direction.

Figure 12:
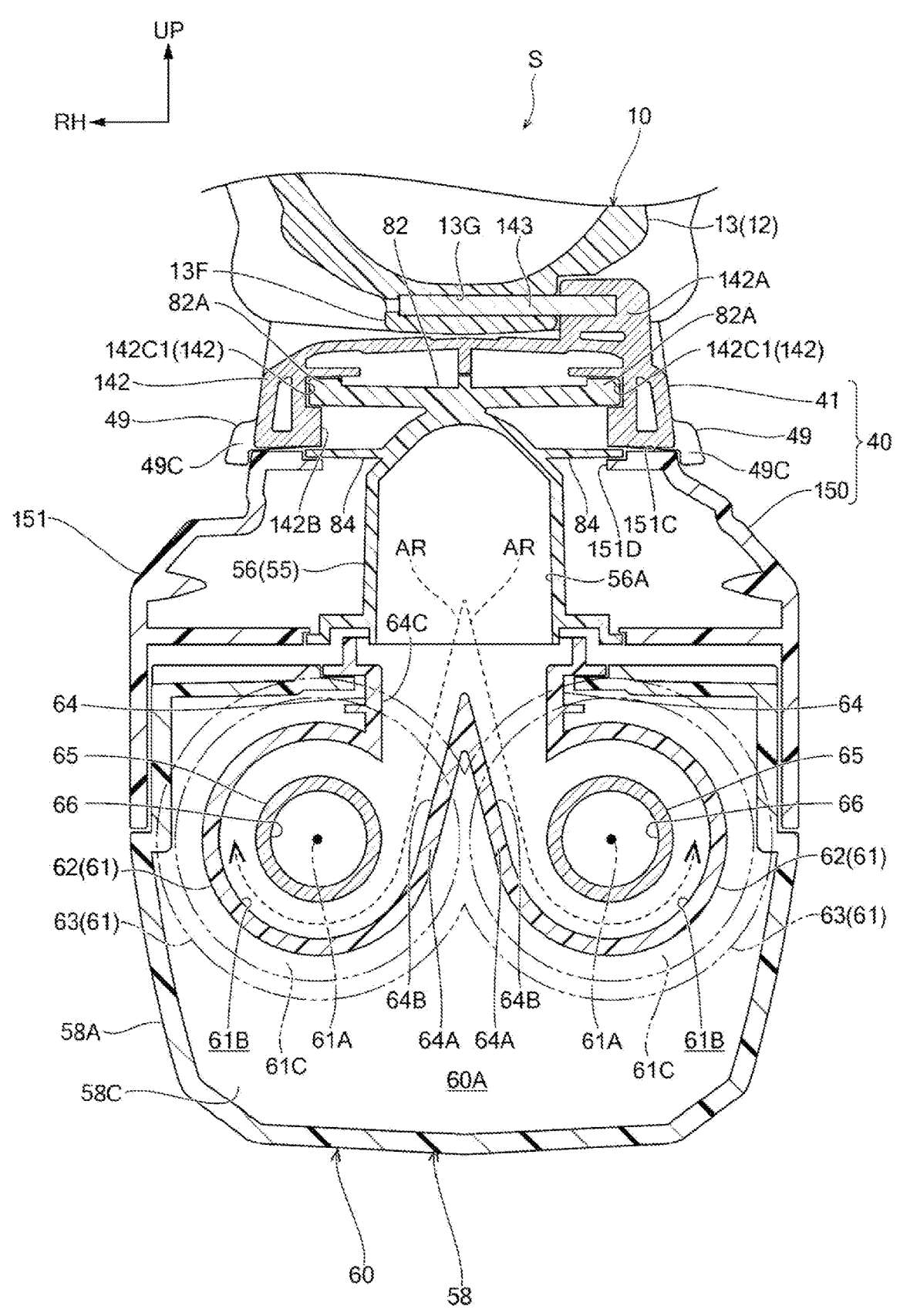
FIG. 12 is a cross-sectional view from the front side showing a connection state between the hammer drill and the adapter of the hammer drill system shown in FIG. 10 (a cross-sectional view along line 4-4 in FIG. 10).

As shown in FIG. 12, a support portion 13F for supporting the adapter 41 to be described later is formed at the lower wall of the main body housing 13 on the front side of the front intake port 13B. The support portion 13F protrudes downward from the main body housing 13 and extends in the left-right direction. A support hole 13G is formed in the support portion 13F, and the support hole 13G penetrates in the left-right direction.

The upper portion of the handle housing 14 is configured as a handle unit 14A which is gripped by a user. A trigger 15 is provided at the upper end portion of the handle unit 14A. The trigger 15 protrudes forward from the handle unit 14A and is configured to be capable of being pulled rearward. A switch mechanism 16 is provided on the rear side of the trigger 15. The switch mechanism 16 has a switch (not shown) which is operated by the trigger 15. The switch is electrically connected to a control unit (not shown) of the hammer drill and is configured to output an output signal according to the operating state of the trigger 15 to the control unit.

The lower end portion of the handle housing 14 is configured as a battery mounting portion 14B for mounting the battery pack 34 to be described later. The battery mounting portion 14B protrudes forward from the lower end portion of the handle housing 14 and is bent downward. In addition, the battery mounting portion 14B is provided with a connector 17 which is connected to the battery pack 34.

(Motor 20) As shown in FIG. 10, the motor 20 is configured as a three-phase brushless motor, accommodated in the rear portion of the main body housing 13, and electrically connected to the control unit. The motor 20 has a drive shaft 21 with the front-rear direction as an axial direction. The front-end-side portion of the drive shaft 21 is rotatably supported by a front-side bearing 18 fixed to the main body housing 13, and the rear end portion of the drive shaft 21 is rotatably supported by a rear-side bearing 19 fixed to the main body housing 13. In addition, a pinion gear 21A is formed at the front end portion of the drive shaft 21.

As shown in FIGS. 10. 3, and 4, a fan 23 is integrally rotatably provided at the front-end-side portion of the drive shaft 21. The fan 23 is formed as a whole in a disc shape with the front-rear direction as a thickness direction. The fan 23 is configured to include a first fan unit 23A constituting a rear portion of the fan 23 and a second fan unit 23B constituting a front portion of the fan 23, and the first fan unit 23A and the second fan unit 23B are configured as a centrifugal fan.

The first fan unit 23A is configured to include a base plate 24 and a plurality of first fins 25. The base plate 24 is formed in a substantially annular plate shape with the front-rear direction as a plate thickness direction. The first fins 25 are formed on the rear surface of the base plate 24 and extend in the radial direction of the base plate 24. In addition, the plurality of first fins 25 is disposed at predetermined angular intervals in the circumferential direction of the base plate 24. Further, the first exhaust port 13C of the housing 12 is disposed radially outside of the fan 23 with respect to the first fins 25. When the fan 23 rotates together with the drive shaft 21, the first fins 25 generate an air flow that flows radially outward from the fan 23. Thereby, the motor 20 is cooled by the first fan unit 23A that causes air to flow from the rear intake ports 13A into the main body housing 13 and causes the air to flow out from the first exhaust port 13C.

The second fan unit 23B is configured to include the base plate 24, a plurality of second fins 26, and a fan cover 27. That is, the base plate 24 is configured as a common portion of the first fan unit 23A and the second fan unit 23B. The second fins 26 are formed on the front surface of the base plate 24 and extend in the radial direction of the base plate 24. In addition, the plurality of second fins 26 is disposed at predetermined angular intervals in the circumferential direction of the base plate 24. Further, the second exhaust ports 13D of the housing 12 are disposed radially outside of the fan 23 with respect to the second fins 26.

The fan cover 27 is formed in a substantially annular plate shape and is connected to the front end portions of the second fins 26. The fan cover 27 is slightly inclined forward as it goes radially inward in a side view. In addition, the central opening of the fan cover 27 is configured as a fan intake port 27A, and the inner diameter of the fan intake port 27A is set to be larger than the diameter of the drive shaft 21. In addition, the front end portion of the fan cover 27 is disposed on the upper side of the front intake port 13B of the housing 12.

When the fan 23 rotates together with the drive shaft 21, air flows from the fan intake port 27A of the second fan unit 23B into the second fan unit 23B, and the second fins 26 allow the inflow air to flow radially outward from the fan 23. Thereby, the second fan unit 23B is configured to generate an air flow AR that flows from the front intake port 13B into the main body housing 13. The air flow AR passes through the inside of the second fan unit 23B and is exhausted from the second exhaust ports 13D.

(Drive mechanism unit 30) As shown in FIG. 10, the drive mechanism unit 30 is configured as a mechanism unit that transmits the rotational force of the motor 20 to the tip tool T to drive the tip tool T. The drive mechanism unit 30 is accommodated in the front end portion of the main body housing 13. Specifically, the drive mechanism unit 30 is disposed on the front side of the fan 23. The drive mechanism unit 30 is configured to include an intermediate shaft 31 and a transmission unit 32.

The intermediate shaft 31 is formed in a substantially columnar shape with the front-rear direction as an axial direction, and is rotatably supported by a bearing (not shown) fixed to the main body housing 13. A gear (not shown) is integrally rotatably provided at the rear end portion of the intermediate shaft 31, and the gear is meshed with the pinion gear 21A of the drive shaft 21. Thereby, the motor 20 is driven and the drive shaft 21 rotates, so that the intermediate shaft 31 rotates around its own axis. The intermediate shaft 31 is provided with a motion conversion member (not shown), and the motion conversion member converts the rotational motion of the intermediate shaft 31 into a reciprocating motion in the front-rear direction and transmits the converted motion to the transmission unit 32 to be described later.

The transmission unit 32 extends in the front-rear direction on the upper side of the intermediate shaft 31. The tip tool T is mounted on the front end portion of the transmission unit 32. The tip tool T is formed in a substantially columnar shape with the front-rear direction as an axial direction, and the rear end portion of the tip tool T is mounted on the transmission unit 32. In addition, the transmission unit 32 is connected to the intermediate shaft 31. Thereby, the rotational force of the motor 20 is transmitted to the tip tool T, and the tip tool T rotates around its own axis to perform drilling on a workpiece.

(Battery pack 34) As shown in FIGS. 9 and 10, the battery pack 34 is formed in a substantially rectangular parallelepiped shape. The battery pack 34 is mounted on the battery mounting portion 14B of the handle housing 14 from the rear side. The battery pack 34 has a connector (not shown), and the connector is connected to the connector 17 to supply electric power from the battery pack 34 to the motor 20. In addition, the battery pack 34 has a pair of engagement members 34A, and the engagement members 34A are provided on the right and left side portions of the battery pack 34. The engagement members 34A are engaged with the handle housing 14 to restrict rearward movement of the battery pack 34.

(Dust collection device 40) As shown in FIG. 9, the dust collection device 40 is configured to include a dust collection device main body 150 serving as a main body and the adapter 41 for connecting the dust collection device main body 150 and the hammer drill 10. In addition, although the details will be described later, the inside of the dust collection device main body 150 and the inside of the main body housing 13 communicate with each other through the front intake port 13B, and thus the air flow AR generated by the second fan unit 23B of the fan 23 causes air in the dust collection device main body 150 to flow from the front intake port 13B into the main body housing 13. More specifically, the air flow AR causes air and dust around the tip tool T to be suctioned into the dust collection device main body 150, separates the suctioned air and dust in the dust collection device main body 150, and causes the separated air to flow out from the front intake port 13B into the main body housing 13. Hereinafter, the adapter 41 will be first described, and then the dust collection device main body 150 will be described.

(Adapter 41) FIG. 10

As shown in FIG. 12, the adapter 41 is detachably mounted on the main body housing 13 of the hammer drill 10 and is configured as a connection member that connects the dust collection device main body 150 to be described later to the hammer drill 10. The adapter 41 is configured to include an adapter main body 142 and a pair of right and left adapter locking members 49.

As shown in FIGS. 13 to 16, the adapter main body 142 is formed in a substantially rectangular plate shape with the vertical direction as a thickness direction and with the front-rear direction as a longitudinal direction. A shaft fixing portion 142A protruding upward is provided at the left portion of the front end portion of the adapter main body 142. A support shaft 143 is provided in the shaft fixing portion 142A, and the support shaft 143 is formed in a substantially columnar shape with the left-right direction as an axial direction and extends out rightward from the shaft fixing portion 142A. Thereby, the support shaft 143 is provided separately on the upper side of the front end portion of the adapter main body 142. In a state where the adapter 41 is mounted on the hammer drill 10, the support shaft 143 is inserted into the support hole 13G of the hammer drill 10 from the left side, and the front end portion of the adapter 41 is supported by the hammer drill 10.

A mounting recess portion 142B for mounting a mounting portion 82 of the dust collection device main body 150 to be described later is formed on the lower surface of the adapter main body 142, and the mounting recess portion 142B is formed in a recessed shape that opens downward and forward and is formed in a substantially rectangular shape when viewed from below. A rail groove 142C that opens toward the inside of the mounting recess portion 142B is formed in the upper portion of the inner circumferential surface of the mounting recess portion 142B. The rail groove 142C extends in the circumferential direction of the mounting recess portion 142B, and both ends of the rail groove 142C in the longitudinal direction open forward. That is, the rail groove 142C is configured to include a pair of side rail grooves 142C1 serving as engaged portions formed on the right and left inner circumferential surfaces of the mounting recess portion 142B and a rear rail groove 142C2 formed on the rear surface of the mounting recess portion 142B. The rear end portion of the side rail groove 142C1 (end portion on one side in the front-rear direction) and both ends of the rear rail groove 142C2 in the left-right direction communicate with each other, and the front end portion of the side rail groove 142C1 (end portion on the other side in the front-rear direction) opens forward. In addition, the groove width dimension (vertical dimension) of the side rail groove 142C1 is formed so as to decrease toward the rear side (see FIG. 15). That is, the top surface of the mounting recess portion 142B is inclined downward toward the rear side.

As adapter connection portion 142D is formed in an intermediate portion of the adapter main body 142 in the front-rear direction. The adapter connection portion 142D is formed in a substantially rectangular cylindrical shape with the vertical direction as an axial direction and with the left-right direction as a longitudinal direction. The adapter connection portion 142D penetrates in the vertical direction, and the adapter connection portion 142D and the rear end portion of the mounting recess portion 142B communicate with each other. In addition, the upper end portion of the adapter connection portion 142D protrudes further upward than the adapter main body 142. In a state where the adapter 41 is mounted on the hammer drill 10, the upper end portion of the adapter connection portion 142D is fitted into the front intake port 13B of the hammer drill 10 (see FIG. 11).

A pair of right and left arrangement recess portions 142E (see FIG. 14) for arranging the adapter locking members 49 to be described later are formed in the side portion of the rear end portion of the adapter main body 142. The arrangement recess portions 142E are formed in a recessed shape that opens outward in the left-right direction and penetrate in the vertical direction.

A spacer accommodating portion 142F is formed on the upper surface of the adapter main body 142. The spacer accommodating portion 142F is formed in a recessed shape that opens upward and is formed in a substantially T-shape in a plan view. The adapter connection portion 142D is disposed inside the rear portion of the spacer accommodating portion 142F. In addition, a pair of right and left partitioning ribs 142G (see FIG. 13) extending in the left-right direction are formed inside the spacer accommodating portion 142F, and the partitioning ribs 142G extend out inward in the left-right direction from the right and left lateral sides of the spacer accommodating portion 142F. Thereby, the front end portion and the rear portion of the spacer accommodating portion 142F are partitioned in the front-rear direction by the partitioning ribs 142G.

A front spacer 144 serving as a spacer is detachably provided at the front end portion of the spacer accommodating portion 142F. The front spacer 144 is formed in a substantially rectangular plate shape with the vertical direction as a plate thickness direction and is made of an elastic material such as rubber. In addition, the front spacer 144 is configured to be fittable into the front intake port 13B of the hammer drill 10. That is, in the type of single use of the hammer drill 10, the front spacer 144 is configured to be fitted into the front intake port 13B and to function a lid unit that blocks the opening of the front intake port 13B. On the other hand, in the type of use in which the dust collection device 40 is mounted on the hammer drill 10, the front spacer 144 is configured to be detached from the front intake port 13B and to be mounted on the spacer accommodating portion 142F of the adapter 41.

A rear spacer 145 is provided at the rear portion of the spacer accommodating portion 142F. The rear spacer 145 is formed in a substantially T-shaped plate shape with the vertical direction as a plate thickness direction and is made of an elastic material such as rubber. In a state where the adapter 41 is mounted on the hammer drill 10, the lower wall of the main body housing 13 is configured to abut on the upper surfaces of the front spacer 144 and the rear spacer 145 (see FIG. 11). Meanwhile, an insertion portion 45A through which the adapter connection portion 142D is inserted is formed through the rear spacer 145.

At the rear end portion of the lower surface of the adapter main body 142, a spring accommodating portion 142H (see FIG. 16) that opens downward is formed between the pair of arrangement recess portions 142E, and the spring accommodating portion 142H extends in the left-right direction. In addition, a lid member 46 is provided at the rear end portion of the adapter main body 142, and the opening of the spring accommodating portion 142H is blocked by the lid member 46. A lock recess portion 46A is formed at the central portion of the front end portion of the lid member 46 in the left-right direction. The lock recess portion 46A is formed in a recessed shape that protrudes upward and opens forward and downward.

In addition, on the lower surface of the adapter main body 142, a lock groove (see FIG. 14) is formed between the mounting recess portion 142B and the lid member 46, and the mounting recess portion 142B and the lock recess portion 46A communicate with each other in the front-rear direction through a lock groove 142J. In addition, a lock hook portion 42K (see FIG. 14) projecting to the central side of the adapter main body 142 in the width direction is formed at the right portion of the lock groove 142J.

Figure 16:
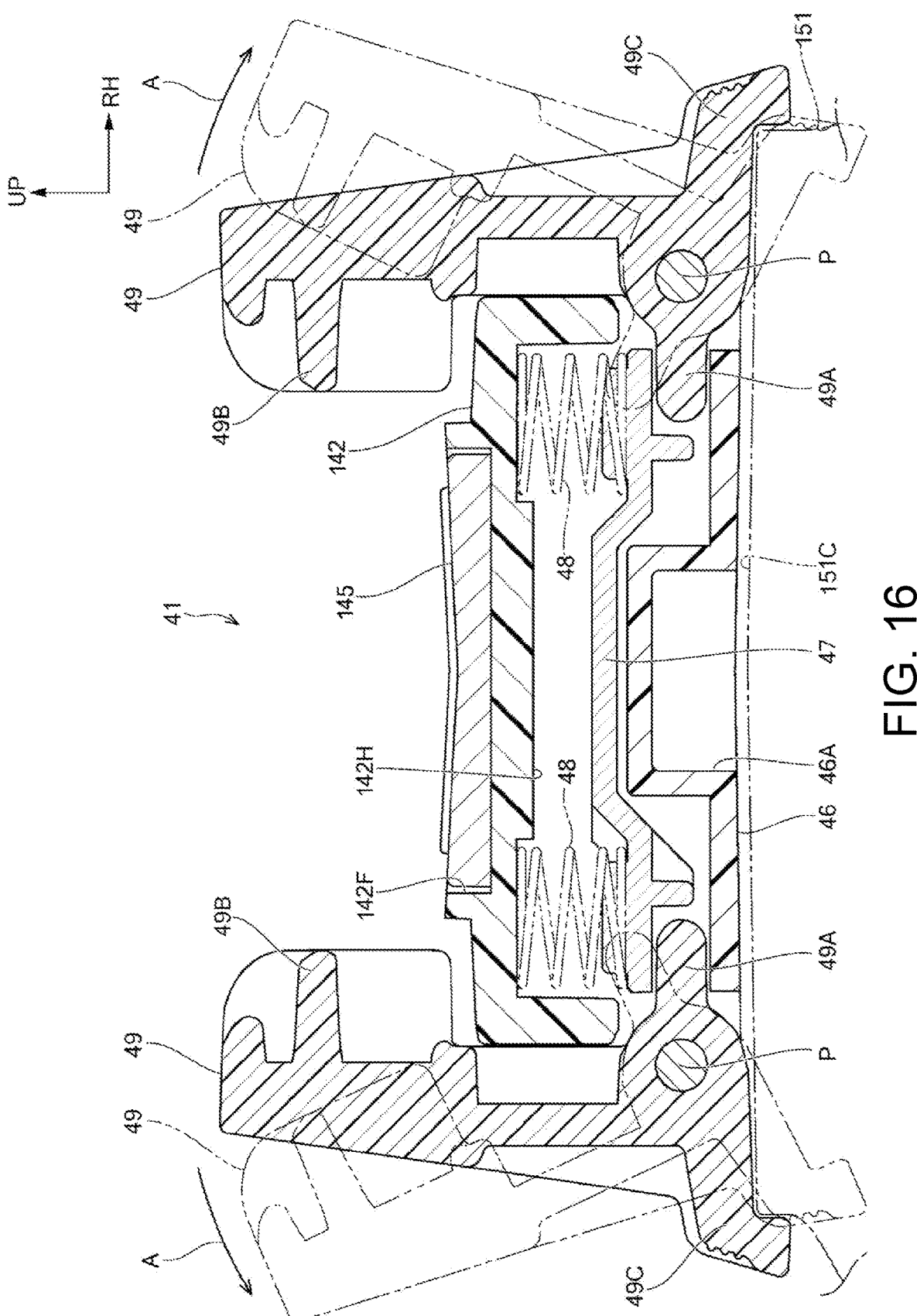
FIG. 16 is a cross-sectional view from the rear side of the adapter shown in FIG. 13 (a cross-sectional view along line 1-1 in FIG. 13).

In addition, as shown in FIG. 16, a base plate 47 is provided on the upper side of the lock recess portion 46A of the lid member 46 within the spring accommodating portion 142H. The base plate 47 is formed in a substantially elongated plate shape with the vertical direction as a plate thickness direction and with the left-right direction as a longitudinal direction. In addition, the central portion of the base plate 47 in the left-right direction protrudes upward and is disposed adjacent to the upper side of the lock recess portion 46A. Further, a pair of right and left biasing springs 48 are provided in the spring accommodating portion 142H. The biasing springs 48 are configured as compression coil springs and are disposed between both ends of the base plate 47 in the longitudinal direction and the top surface of the spring accommodating portion 142H. Thereby, the base plate 47 is biased downward by the biasing springs 48.

As shown in FIGS. 13 to 16, the adapter locking member 49 is formed as a whole in a substantially T-shaped plate shape with the left-right direction as a plate thickness direction. The lower end portion of the adapter locking member 49 is disposed in the arrangement recess portion 142E of the adapter main body 142, and is rotatably connected to the adapter main body 142 by a pin P with the front-rear direction as an axial direction. In a state where the adapter locking member 49 is connected to the adapter main body 142, the upper end portion of the adapter locking member 49 protrudes further upward than the adapter main body 142. Specifically, the pair of right and left adapter locking members 49 are disposed so as to face each other in the left-right direction (a state shown by solid lines in FIG. 16; hereinafter, this state is referred to as a locked state).

A protruding piece 49A (see FIG. 16) protruding inward in the left-right direction is formed at the lower end portion of the adapter locking member 49, and the protruding piece 49A is disposed inside the spring accommodating portion 142H of the adapter main body 142 and is disposed between the lid member 46 and the base plate 47. Thereby, the adapter locking member 49 is held in the locked state by the biasing force of the biasing springs 48. In addition, the lid member 46 restricts the rotation of the adapter locking member 49 to one side in the rotation direction (direction in which the upper end portions of the pair of adapter locking members 49 approach each other). On the other hand, the adapter locking member 49 is rotated by a worker's operation to the other side in the rotation direction (side in the direction of an arrow A in FIG. 16) against the biasing force of the biasing springs 48, and thus the upper end portions of the pair of adapter locking members 49 are separated from each other (a state shown by dashed-two dotted lines in FIG. 16; hereinafter, this state is referred to as an unlocked state). That is, the adapter locking member 49 is configured to be switchable between the locked state and the unlocked state.

A locking hook 49B is formed at the upper end portion of the adapter locking member 49. The locking hook 49B protrudes inward in the left-right direction of the adapter 41 and extends in the front-rear direction. In a state where the adapter 41 is mounted on the main body housing 13, the locking hook 49B of the adapter locking member 49 in the locked state is inserted into the locking recess portion 13E of the main body housing 13, and the adapter locking member 49 is locked to the main body housing 13 (see FIGS. 9 and 20).

A locking operation portion 49C is formed at the lower end portion of the adapter locking member 49, and the locking operation portion 49C is configured as a portion to be gripped by a worker when the worker performs a switching operation. The locking operation portion 49C protrudes outward in the left-right direction of the adapter 41, and the tip portion of the locking operation portion 49C is bent downward. In a state where the dust collection device main body 150 to be described later is mounted on the adapter 41, a stepped portion 151C of the dust collection device main body 150 is disposed adjacent to the lower side of the locking operation portion 49C and between the tip portions of a pair of locking operation portions 49C (see FIG. 16). Thereby, the tip portions of the locking operation portions 49C abut on the dust collection device main body 150 to restrict the rotation of the adapter locking member 49 to the other side in the rotation direction. That is, the switching of the adapter locking member 49 from the locked state to the unlocked state is prevented.

(Dust collection device main body 150) As shown in FIGS. 9 to 12, 17, and 18, the dust collection device main body 150 extends in the front-rear direction as a whole and is disposed adjacent to the lower side of the main body housing 13. The dust collection device main body 150 is configured to include a dust collection housing 151, an air inflow unit 152, and a dust collection unit 58. In addition, the dust collection device main body 150 has the mounting portion 82 for mounting the dust collection device main body 150 on the adapter 41 and a lock member 86. Hereinafter, each component of the dust collection device main body 150 will be described.

(Dust collection housing 151) The dust collection housing 151 constitutes an upper outer shell of the dust collection device main body 150. The dust collection housing 151 is formed in a substantially box-like shape that opens downward. The dust collection housing 151 is constituted by a housing member divided into two in the left-right direction, and the dust collection housing 151 is configured by assembling the divided housing members. A support cylinder unit 151A in a cylindrical shape with the front-rear direction as an axial direction is formed at the front portion of the dust collection housing 151, and the support cylinder unit 151A is disposed further forward than the main body housing 13 of the hammer drill 10. A connection portion 151B (see FIGS. 10 and 11) for connecting the divided housing members is formed at the rear end portion of the support cylinder unit 151A, and the connection portion 151B is formed in a substantially cylindrical shape with the left-right direction as an axial direction.

In addition, the stepped portion 151C (see FIGS. 9 and 18) lowered one step to the lower side is formed at the upper rear end portion of the dust collection housing 151. In a state where the dust collection device main body 150 is mounted on the adapter 41, the adapter 41 is disposed inside the stepped portion 151C. A first exposure hole 151D (see FIGS. 11 and 18) for exposing the mounting portion 82 to be described later is formed through the stepped portion 151C, and the first exposure hole 151D is formed in a substantially rectangular shape in a plan view. The edge of the first exposure hole 151D is formed in a stepped shape which is lowered one step to the lower side (see FIG. 11). In addition, a second exposure hole 151E (see FIGS. 11 and 18) for exposing the lock member 86 to be described later is formed through the stepped portion 151C on the rear side of the first exposure hole 151D, and the second exposure hole 151E is formed in a substantially rectangular shape in a plan view and communicates with the first exposure hole 151D.

(Air inflow unit 152) As shown in shown in FIG. 10, the air inflow unit 152 is configured as a mechanism unit that allows the air around the tip tool T to flow in and the air to flow out to the dust collection unit 58 to be described later. The air inflow unit 152 constitutes a front upper portion of the dust collection device main body 150. The air inflow unit 152 is configured to include a slide arm 153, a suction unit 154, and an intake pipe 155.

The slide arm 153 is formed in a cylindrical shape with the front-rear direction as an axial direction. The slide arm 153 is connected to the support cylinder unit 151A of the dust collection housing 151 so as to be slidable in the front-rear direction, and the front end portion of the slide arm 153 protrudes further forward than the support cylinder unit 151A.

The suction unit 154 is formed in a cylindrical shape with the vertical direction as an axial direction, and the lower end portion of the suction unit 154 is connected to the front end portion of the slide arm 153. A connection cylinder unit 154A bent rearward is formed at the lower end portion of the suction unit 154, and the connection cylinder unit 154A is disposed inside the front end portion of the slide arm 153.

The upper opening of the suction unit 154 is configured as a suction port 154B. In addition, a tool insertion portion 54C is formed at the upper end portion of the suction unit 154. The tool insertion portion 54C is formed in a substantially cylindrical shape with the front-rear direction as an axial direction, and the suction port 154B opens radially inward from the tool insertion portion 54C. In a state where the dust collection device main body 150 is mounted on the hammer drill 10, the tip portion of the tip tool T is inserted into the tool insertion portion 54C. Thereby, the suction port 154B causes the air around the tip tool T to flow into the suction unit 154.

The intake pipe 155 is configured to include a rear intake pipe 56 constituting a rear portion of the intake pipe 155 and a front intake pipe 57 constituting a front portion of the intake pipe 155. The rear intake pipe 56 is formed in a substantially cylindrical shape with the front-rear direction as an axial direction. The rear intake pipe 56 accommodated in the support cylinder unit 151A of the dust collection housing 151 and is fixed to the dust collection housing 151. A pipe outlet portion 56A protruding downward is formed at the rear end portion of the rear intake pipe 56. The pipe outlet portion 56A is formed in a substantially rectangular cylindrical shape, and the inside of the rear intake pipe 56 and the inside of the pipe outlet portion 56A communicate with each other. Meanwhile, the rear intake pipe 56 is formed in a mounting member 80 having the mounting portion 82 to be described later, and constitutes a front portion of the mounting member 80 (see FIG. 11).

The front intake pipe 57 is formed in a substantially cylindrical shape with the front-rear direction as an axial direction. The front intake pipe 57 is disposed coaxially with the rear intake pipe 56 on the front side of the rear intake pipe 56, and the rear end portion of the front intake pipe 57 is externally inserted into the front end portion of the rear intake pipe 56. The front intake pipe 57 is formed of a stretchable rubber material or the like and is configured to be stretchable in the front-rear direction. Thereby, the intake pipe 155 including the front intake pipe 57 is configured to be stretchable in the front-rear direction. The front end portion of the front intake pipe 57 is externally inserted into the connection cylinder unit 154A of the suction unit 154. Thus, air suctioned from the suction port 154B into the suction unit 154 flows rearward through the intake pipe 155 and flows out downward from the pipe outlet portion 56A.

(Dust collection unit 58) As shown in FIGS. 10 to 12, 17, and 18, the dust collection unit 58 is formed in a substantially rectangular parallelepiped box shape, and is detachably mounted on the dust collection housing 151 on the lower side of the rear intake pipe 56. That is, the dust collection unit 58 is disposed on the rear side of the suction port 154B. The dust collection unit 58 has a cyclone unit 60 serving as an auxiliary mechanism unit constituting a front portion of the dust collection unit 58 and a filter unit 70 constituting a rear-end-side portion of the dust collection unit 58. In addition, the dust collection unit 58 has a first case 58A serving as an outer wall of the dust collection chamber constituting an outer shell of the cyclone unit 60 and a second case 58B constituting an outer shell of the filter unit 70, and the first case 58A and the second case 58B are assembled together. The first case 58A is formed in a cylindrical shape penetrating in the front-rear direction, and the second case 58B is formed in a substantially box-like shape that opens upward. The rear-side opening of the first case 58A is blocked by the second case 58B. Thereby, the front wall of the second case 58B is configured as a partition wall 58C that partitions the cyclone unit 60 from the filter unit 70.

In addition, a dust collection lid 59 is openably provided at the front end portion of the first case 58A, and the dust collection lid 59 is formed in a substantially rectangular plate shape with the front-rear direction as a plate thickness direction. The lower end portion of the dust collection lid 59 is rotatably connected to the first case 58A with the left-right direction as an axial direction, and the upper end portion of the dust collection lid 59 is locked to the first case 58A. Thereby, the dust collection lid 59 blocks the front opening of the first case 58A. In addition, a locking groove 59A (see FIGS. 10 and 11) that opens forward is formed at the upper end portion of the dust collection lid 59. In a state where the dust collection unit 58 is mounted on the dust collection housing 151, the connection portion 151B of the dust collection housing 151 is disposed inside the locking groove 59A, and the front end portion of the dust collection unit 58 is locked to the connection portion 151B. Thereby, in a state where the dust collection unit 58 is mounted on the dust collection housing 151, the dust collection lid 59 is kept blocked.

(Cyclone unit 60) The outer wall of the cyclone unit 60 is constituted by the first case 58A described above. The cyclone unit 60 has a pair of right and left cyclone outer cylinders 61, a pair of right and left cyclone inlet portions 64, and exhaust inner cylinders 65 serving as a pair of right and left inner cylinders.

(Cyclone outer cylinder 61) The pair of cyclone outer cylinders 61 are disposed inside the first case 58A and are disposed at positions symmetrical with respect to the center of the dust collection device main body 150 in the left-right direction. The cyclone outer cylinder 61 is formed as a whole in a substantially cylindrical shape with the front-rear direction as an axial direction, and has a cyclone axis 61A as the central axis of the cyclone outer cylinder 61. In addition, the cyclone outer cylinder 61 is configured to include a rear outer cylinder 62 serving as a first outer cylinder constituting a rear portion of the cyclone outer cylinder 61 and a front outer cylinder 63 serving as a second outer cylinder constituting a front portion of the cyclone outer cylinder 61.

The rear outer cylinder 62 is formed in a cylindrical shape centered on the cyclone axis 61A and protrudes forward from the partition wall 58C. In other words, the rear outer cylinder 62 is formed in a bottomed cylindrical shape that opens forward, and the rear end portion (end portion on one side in the axial direction) of the rear outer cylinder 62 is blocked by the partition wall 58C. In addition, the inner diameter of the rear outer cylinder 62 is set to be constant in the front-rear direction. That is, the inner circumferential surface of the rear outer cylinder 62 is disposed parallel to the cyclone axis 61A.

The front outer cylinder 63 is formed in a substantially conical cylindrical shape centered on the cyclone axis 61A and is disposed on the front side of the rear outer cylinder 62. Specifically, the inner circumferential surface of the front outer cylinder 63 is inclined in a direction approaching the cyclone axis 61A toward the front side. In other words, the inner diameter of the rear end portion (end portion on one side in the axial direction) of the front outer cylinder 63 is set to be larger than the inner diameter of the front end portion (end portion on the other side in the axial direction) of the front outer cylinder 63. In addition, the front outer cylinder 63 is formed integrally with the first case 58A, and a portion of the front outer cylinder 63 constitutes a portion of the right and left sidewalls of the first case 58A. The sidewall of the front outer cylinder 63 is inclined radially inward toward the front side (the other side in the axial direction).

The inner diameter of the rear end portion of the front outer cylinder 63 is set to be larger than the inner diameter of the rear outer cylinder 62, and the front end portion of the rear outer cylinder 62 is disposed inside the rear end portion of the front outer cylinder 63. That is, the front end portion of the rear outer cylinder 62 and the rear end portion of the front outer cylinder 63 overlap each other in the front-rear direction, and an opening 61C is formed between the front end portion of the rear outer cylinder 62 and the rear end portion of the front outer cylinder 63 in the cyclone outer cylinder 61. The opening 61C opens rearward throughout the front outer cylinder 63 and the rear outer cylinder 62 in the circumferential direction. Further, the rear end portions of a pair of right and left front outer cylinders 63 are connected to each other at the central portion of the dust collection device main body 150 in the left-right direction. The inside of the cyclone outer cylinder 61 is configured as a swirling chamber 61B, and a portion other than the swirling chamber 61B inside the first case 58A is configured as a dust collection chamber 60A.

Figure 17:
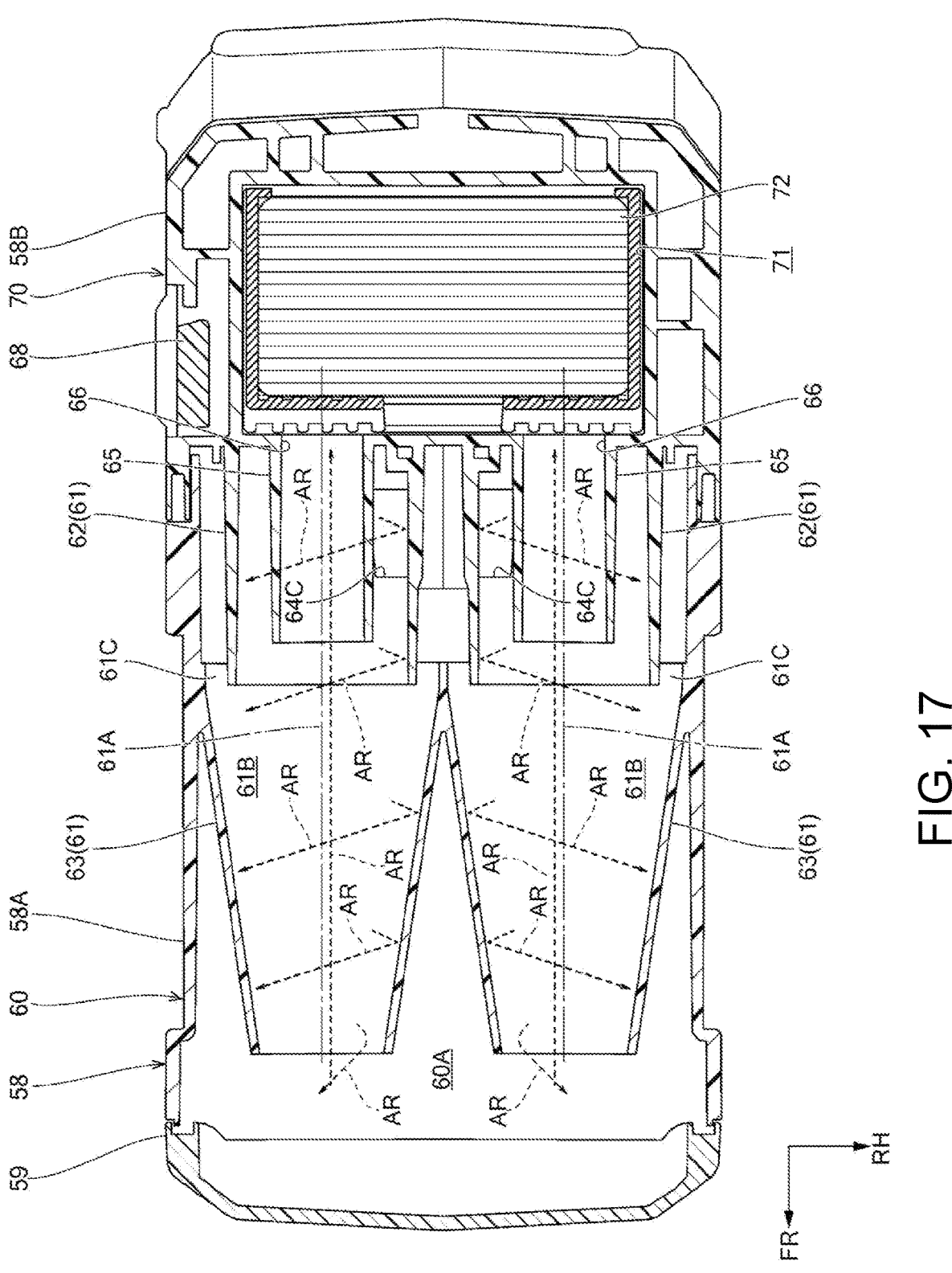
FIG. 17 is a cross-sectional view from the lower side showing a dust collection unit of the dust collection device shown in FIG. 10 (a cross-sectional view along line 11-11 in FIG. 10).
Figure 18:
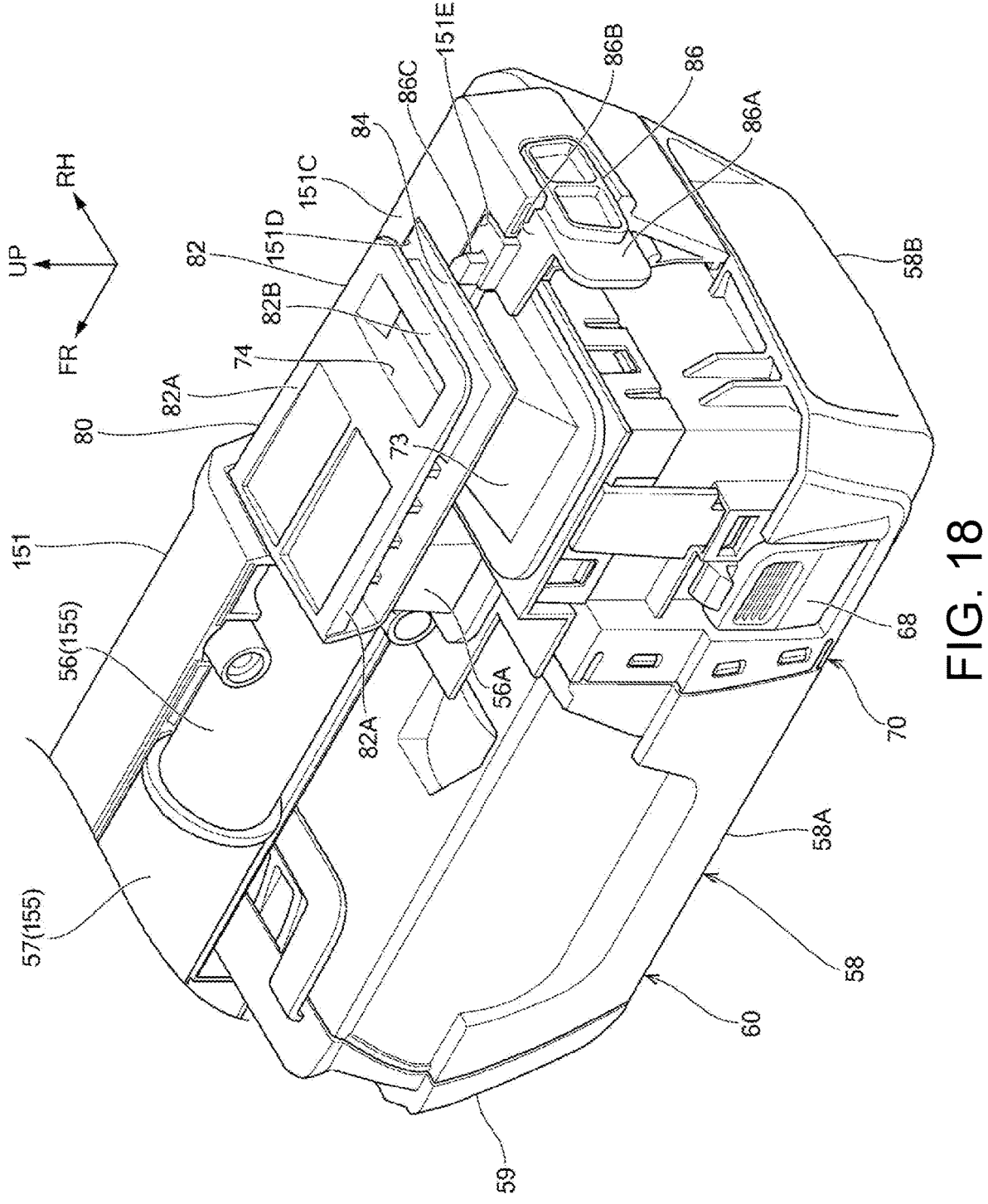
FIG. 18 is a perspective view from the left oblique rear showing the rear end portion of the dust collection device main body in the dust collection device shown in FIG. 10 in a state where a left housing member is removed.

(Cyclone inlet portion 64) As shown in FIGS. 12 and 17, each cyclone inlet portion 64 is provided at the rear end portions of a pair of right and left rear outer cylinders 62. The cyclone inlet portion 64 is formed in a substantially rectangular cylindrical shape with the vertical direction as an axial direction, extends out and upward from the rear outer cylinder 62, and is disposed adjacent to the lower side of the pipe outlet portion 56A of the rear intake pipe 56. Specifically, the cyclone inlet portion 64 extends out and upward from a portion of the rear outer cylinder 62 on the inner side in the left-right direction (the central side of the dust collection device main body 150 in the left-right direction), and the inside of the rear outer cylinder 62 and the inside of the cyclone inlet portion 64 communicate with each other. That is, the cyclone inlet portion 64 is disposed at a position shifted to the central side of the dust collection device main body 150 in the left-right direction with respect to the cyclone axis 61A.

In addition, the sidewall of the cyclone inlet portion 64 on the inner side in the left-right direction is configured as a guide wall 64A, and the inner circumferential surface of the guide wall 64A is configured as a guide surface 64B. The guide surface 64B is inclined inward in the left-right direction toward the upper side in a front view from the front side, and the lower end of the guide surface 64B is connected to the inner circumferential surface of the rear outer cylinder 62. Specifically, in a front view, the guide surface 64B extends out and upward from the lower end of the guide surface 64B in the tangential direction of the inner circumferential surface of the rear outer cylinder 62.

The inside of the cyclone inlet portion 64 is configured as a cyclone inlet hole 64C, and air flowing from the pipe outlet portion 56A into the cyclone inlet hole 64C flows into the rear outer cylinder 62 along the guide surface 64B. That is, the air having flowed into the rear outer cylinder 62 flows forward while swirling along the inner circumferential surface of the rear outer cylinder 62. In addition, the air having flowed out from the front end portion of the rear outer cylinder 62 into the front outer cylinder 63 flows forward while swirling along the inner circumferential surface of the front outer cylinder 63. Thereby, air and dust are separated from each other in the swirling chamber 61B, and the dust is discharged from the front-end opening of the front outer cylinder 63 and accumulated on the lower surface of the dust collection chamber 60A. Meanwhile, the upper ends of the guide wall 64A are connected to each other at the pair of right and left cyclone inlet portions 64.

(Exhaust inner cylinder 65) Each exhaust inner cylinder 65 is provided inside the pair of rear outer cylinders 62. The exhaust inner cylinder 65 is formed in a cylindrical shape centered on the cyclone axis 61A and protrudes forward from the partition wall 58C. In addition, the exhaust inner cylinder 65 penetrates in the front-rear direction. That is, a cyclone outlet hole 66 that penetrates through the partition wall 58C is formed at the rear end portion of the exhaust inner cylinder 65, and the inside of the cyclone unit 60 and the inside of the filter unit 70 to be described later communicate with each other through the cyclone outlet hole 66. The air from which the dust has been separated flows rearward through the central portion of the cyclone outer cylinder 61, flows rearward through the exhaust inner cylinder 65, and flows out to the filter unit 70 to be described later.

(Filter unit 70) As shown in FIGS. 10, 11, 17, and 18, the outer shell of the filter unit 70 is constituted by the second case 58B described above. A dust collection locking member 68 is provided on the left side of the second case 58B, and the dust collection locking member 68 is formed in a substantially rectangular plate shape with the left-right direction as a plate thickness direction. The lower end portion of the dust collection locking member 68 is rotatably connected to the second case 58B with the front-rear direction as an axial direction. In a state where the dust collection unit 58 is mounted on the dust collection housing 151, the upper end portion of the dust collection locking member 68 is engaged with the inner surface of the left wall of the dust collection housing 151.

The inside of the filter unit 70 is configured as a filter chamber 71, and the exhaust inner cylinder 65 and the filter chamber 71 communicate with each other through the cyclone outlet hole 66 described above. A filter 72 is provided at the intermediate portion of the upper portion of the filter chamber 71 in the vertical direction. The filter 72 is formed in a sheet shape and folded in a pleated shape. Specifically, the filter 72 is folded in a pleated shape and overlapped in the front-rear direction so that, in a side view, the mountain-folded folds of the filter 72 constitute the upper end portion of the filter 72 and the valley-folded folds of the filter 72 constitute the lower end portion of the filter 72.

In addition, a dust collection discharge unit 73 is provided on the upper side of the second case 58B, and the dust collection discharge unit 73 is disposed on the rear side of the rear intake pipe 56 and formed integrally with the rear intake pipe 56. The dust collection discharge unit 73 is formed in a substantially rectangular cylindrical shape penetrating in the vertical direction. More specifically, the dust collection discharge unit 73 is formed so that the cross-sectional area of the dust collection discharge unit 73 decreases toward the upper side. Thereby, the inside and outside of the filter chamber 71 communicate with each other through the dust collection discharge unit 73. The upper end portion of the dust collection discharge unit 73 is disposed inside the first exposure hole 151D of the dust collection housing 151 and protrudes upward from the stepped portion 151C of the dust collection housing 151 (see FIG. 18).

Further, the upper opening of the dust collection discharge unit 73 is configured as a dust collection outlet 74 serving as an outlet, and the outward shape of the dust collection outlet 74 substantially coincides with the internal shape of the adapter connection portion 142D of the adapter 41. In a state where the dust collection device 40 is mounted on the hammer drill 10, the dust collection discharge unit 73 is disposed adjacent to the lower side of the adapter connection portion 142D of the adapter 41 (see FIG. 11). Thereby, the inside of the main body housing 13 and the inside of the dust collection device main body 150 communicate with each other through the dust collection outlet 74 and the front intake port 13B. Therefore, air having flowed from the cyclone unit 60 into the filter chamber 71 flows upward and passes through the filter 72. The air having passed through the filter 72 flows from the dust collection outlet 74 into the main body housing 13. Thereby, an air passage portion 90 serving as a flow channel for causing the air around the tip tool T to the main body housing 13 of the hammer drill 10 is constituted by the air inflow unit 152, the cyclone unit 60, and the filter chamber 71.

Figure 11:
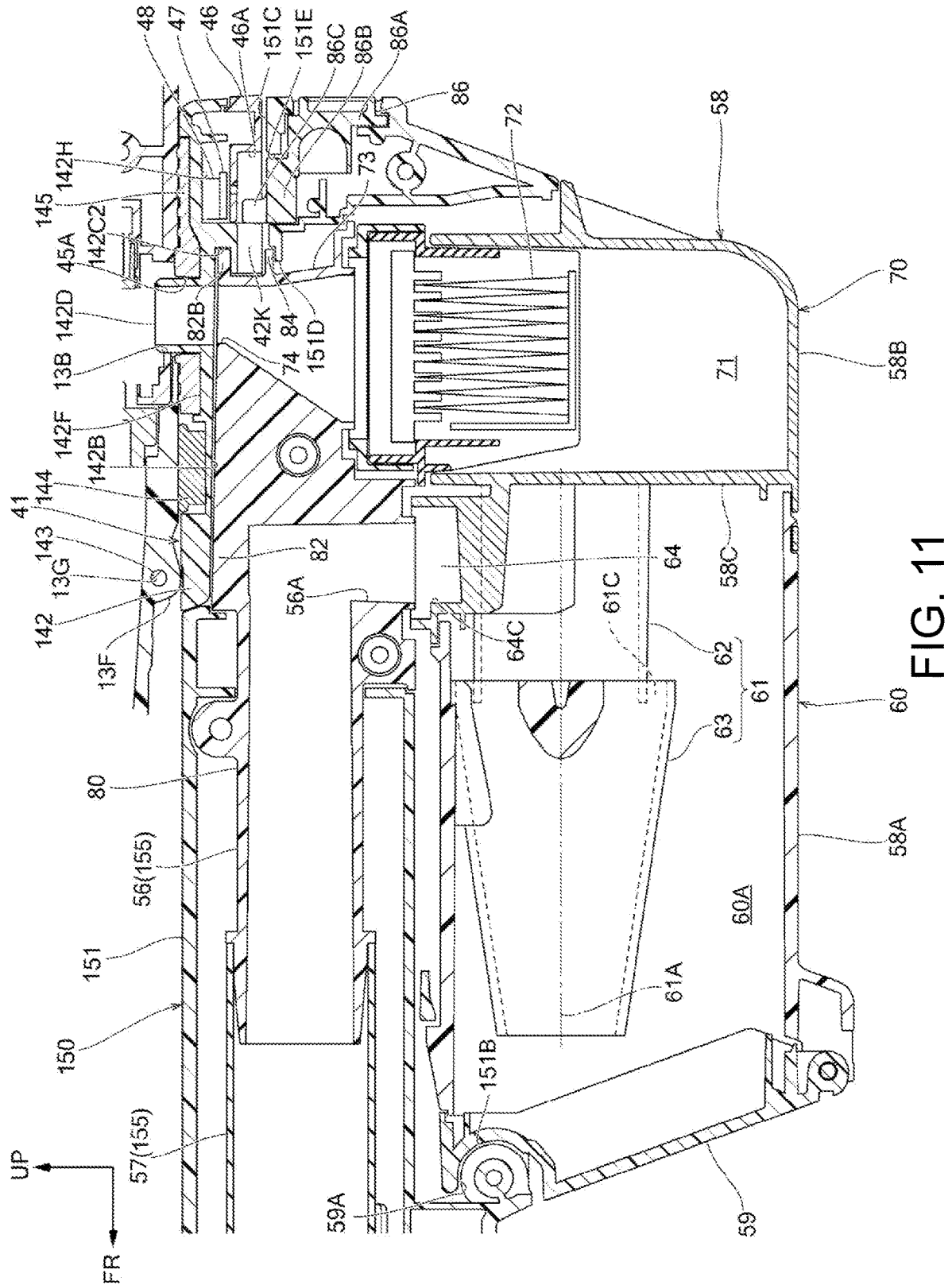
FIG. 11 is an enlarged cross-sectional side view showing the periphery of an adapter of the hammer drill system shown in FIG. 10.
Figure 13:
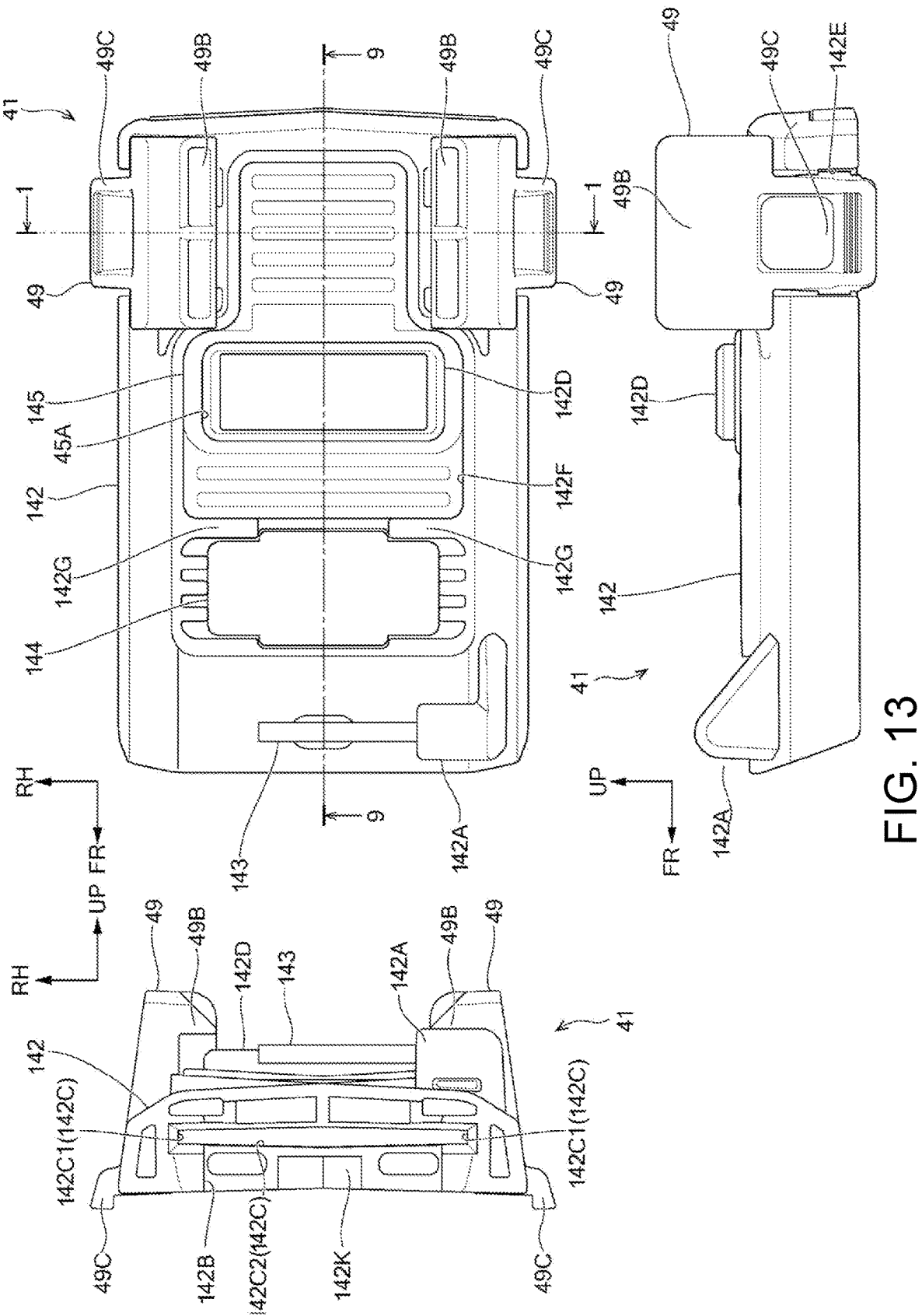
FIG. 13 is a three-sided view showing the adapter of the dust collection device shown in FIG. 10.

(Mounting portion 82) As shown in FIGS. 11, 12, and 13, the mounting portion 82 is provided at the upper end portion of the rear portion of the mounting member 80, and the mounting member 80 has the rear intake pipe 56 and the dust collection discharge unit 73 described above. The mounting portion 82 is formed in a substantially rectangular plate shape with the vertical direction as a plate thickness direction, and the rear portion of the mounting portion 82 is connected to the upper end portion of the dust collection discharge unit 73. Further, both ends of the mounting portion 82 in the left-right direction protrude further outward than the dust collection discharge unit 73 in the left-right direction, and the mounting portion 82 is connected to the upper end portion of the dust collection discharge unit 73 so that the rear end portion of the mounting portion 82 protrudes further rearward than the dust collection discharge unit 73. Thereby, the mounting portion 82 is disposed further upward than the stepped portion 151C of the dust collection housing 151.

Both end portions of the mounting portion 82 in the left-right direction (specifically, portions protruding further outward than the dust collection discharge unit 73 in the left-right direction) are configured as side rails 82A serving as engagement portions. That is, the side rail 82A extends in the front-rear direction on the outer side of the dust collection outlet 74 in the left-right direction. In addition, the rail width dimension (vertical dimension) of the side rail 82A corresponds to the side rail groove 142C1 of the adapter 41 and is set to decrease toward the rear side. That is, the upper surface of the mounting portion 82 corresponds to the top surface of the mounting recess portion 142B of the adapter 41 and is inclined downward toward the rear side. In a state where the dust collection device main body 150 is mounted on the adapter 41, the side rail 82A is slidably inserted into the side rail groove 142C1 of the adapter 41 in the front-rear direction and is engaged with the side rail groove 142C1 in the vertical direction.

The rear end portion of the mounting portion 82 (specifically, the portion protruding further rearward than the dust collection discharge unit 73) is configured as a rear rail 82B. That is, the rear rail 82B extends in the left-right direction on the rear side of the dust collection outlet 74. In a state where the dust collection device main body 150 is mounted on the adapter 41, the rear rail 82B is slidably inserted in the rear rail groove 142C2 of the adapter 41 in the front-rear direction and is engaged with the rear rail groove 142C2 in the vertical direction.

In addition, a cover plate portion 84 is formed on the lower side of the mounting portion 82. The cover plate portion 84 is formed in a substantially rectangular plate shape with the vertical direction as a plate thickness direction similarly to the mounting portion 82, and is connected to the dust collection discharge unit 73. The cover plate portion 84 is disposed on the upper side of the edge of the first exposure hole 151D in the dust collection housing 151 to block the first exposure hole 151D.

(Lock member 86) The lock member 86 is disposed on the rear side of the mounting member 80 and is mounted on the dust collection housing 151 in the stepped portion 151C of the dust collection housing 151 so as to be slidable in the left-right direction. Specifically, the lock member 86 is biased to the right side by a spring (not shown) so as to be in the locked state shown in FIG. 18, and is configured to be switchable from the locked state to a permitted state slid to the left side by a worker's operation.

The lock member 86 is formed in a substantially L-shaped plate shape. Specifically, the lock member 86 is configured to include a lock operation portion 86A with the front-rear direction as a plate thickness direction and a lock main body 86B extending out forward from the upper end portion of the lock operation portion 86A.

The lock operation portion 86A is operably exposed rearward from the dust collection housing 151. That is, in a state where the dust collection device main body 150 is mounted on the adapter 41, the lock operation portion 86A is disposed on the rear side of the adapter locking member 49 of the adapter 41 and is disposed between the pair of adapter locking members 49 when viewed from the rear side. A lock portion 86C is formed on the upper surface of the lock main body 86B, and the lock portion 86C is disposed inside the second exposure hole 151E of the stepped portion 151C in the dust collection housing 151.

Figure 14:
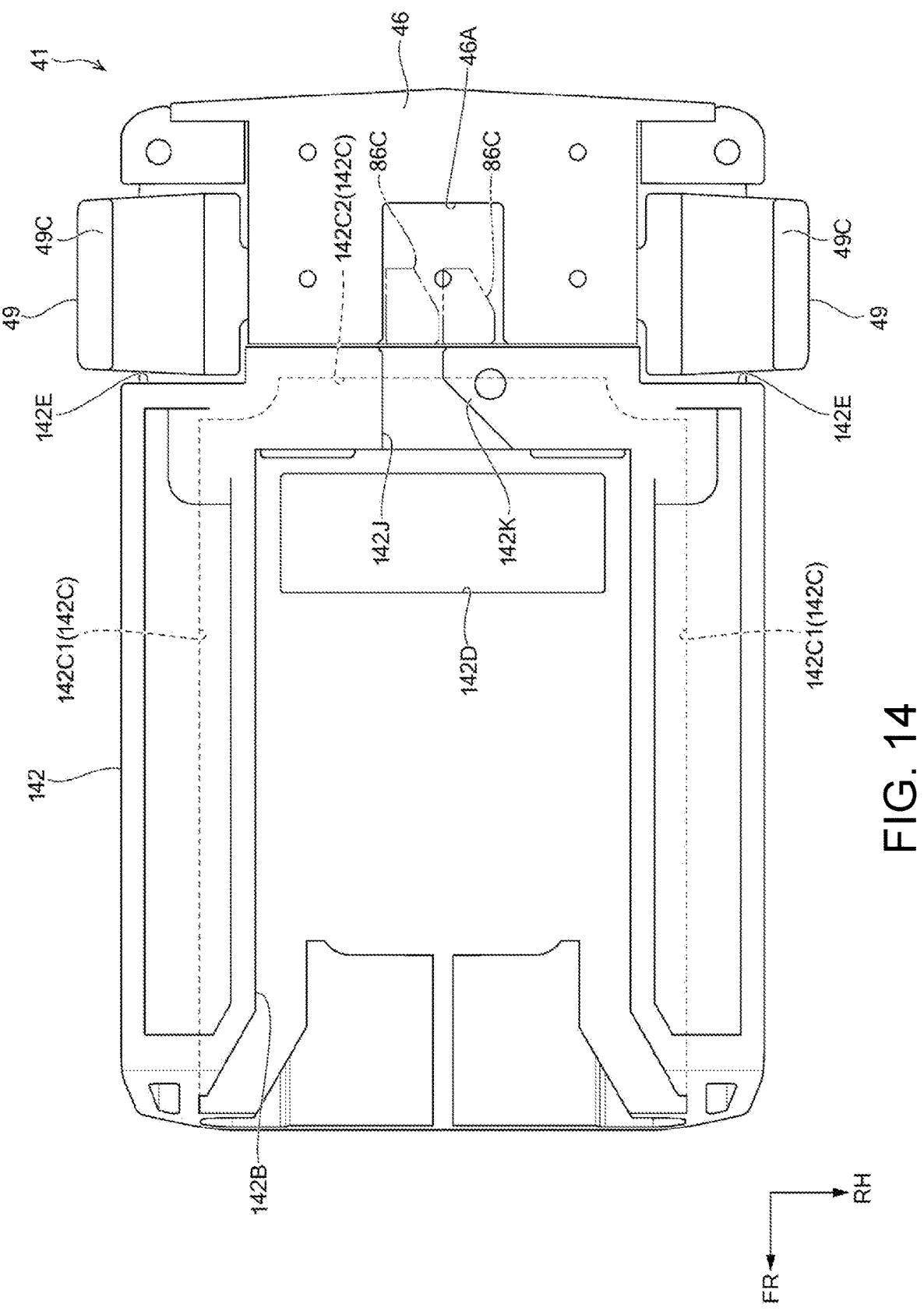
FIG. 14 is a bottom view from the lower side of the adapter shown in FIG. 13.
Figure 15:
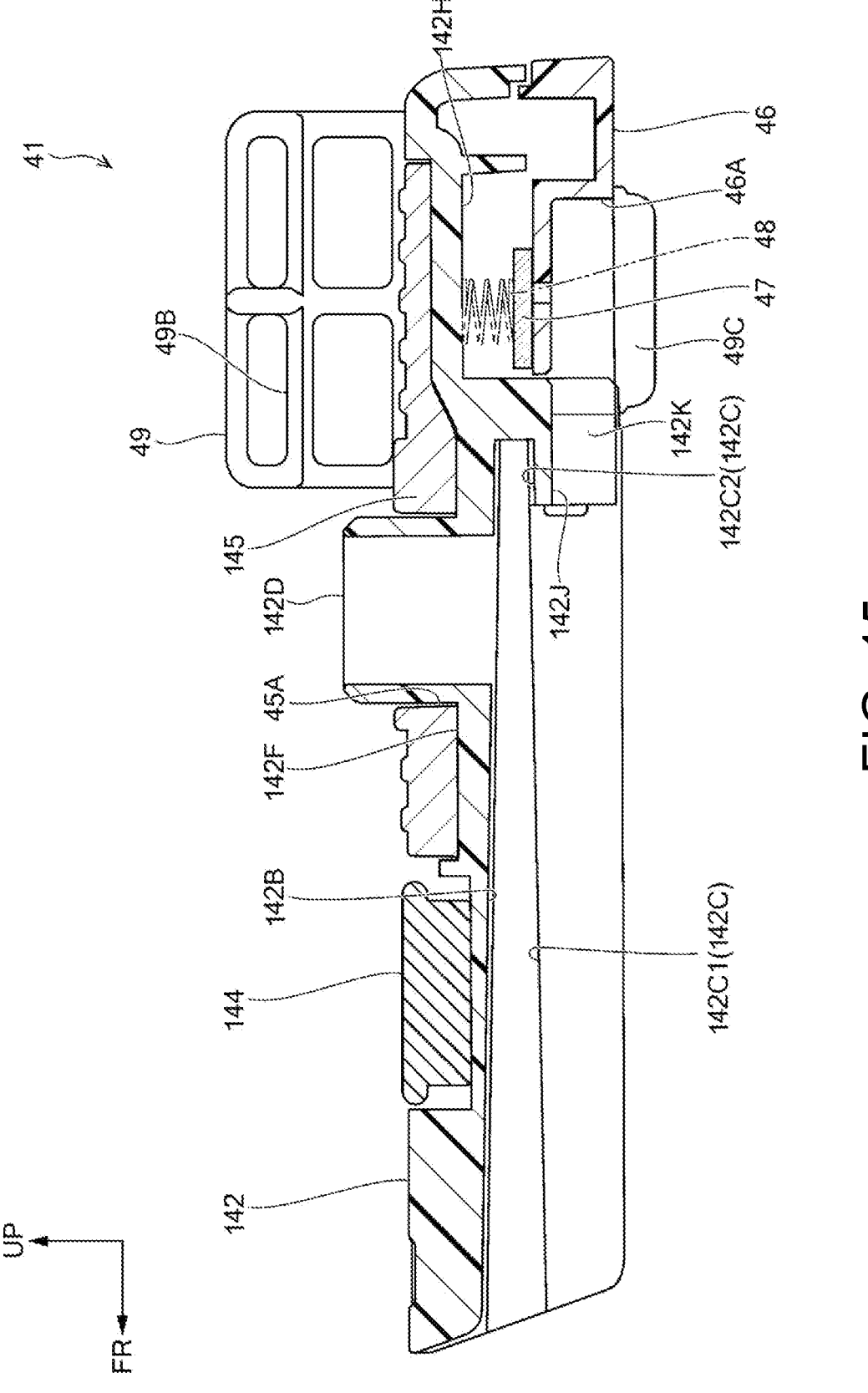
FIG. 15 is a cross-sectional side view of the adapter shown in FIG. 13 (a cross-sectional view along line 9-9 in FIG. 13).

When the dust collection device main body 150 is mounted on the adapter 41, by sliding the dust collection device main body 150 rearward, the lock portion 86C comes into contact with the inclined surface formed on the front surface of the lock hook portion 42K and slides to the left side, and is disposed inside the lock recess portion 46A of the adapter 41 (see the lock portion 86C shown by a dashed-dotted line in FIG. 14). The lock member 86 is moved to the right side by a spring (not shown) and switched to the locked state, so that the lock portion 86C is disposed adjacent to the rear side of the lock hook portion 42K (see the lock portion 86C shown by a dashed-two dotted line in FIG. 14), and the lock portion 86C and the lock hook portion 42K of the adapter 41 are engaged with each other in the front-rear direction. Thereby, removal of the dust collection device main body 150 from the adapter 41 is prevented. On the other hand, the lock member 86 is switched to the permitted state by a worker's operation, and thus the state of engagement between the lock portion 86C and the lock hook portion 42K is released. Thereby, the dust collection device main body 150 is permitted to move forward relative to the adapter 41, and the dust collection device main body 150 is permitted to be removed from the adapter 41.

(Operations and effects) Next, the operations and effects of the second embodiment will be described while describing a procedure of mounting the dust collection device 40 on the hammer drill 10.

Figure 19:
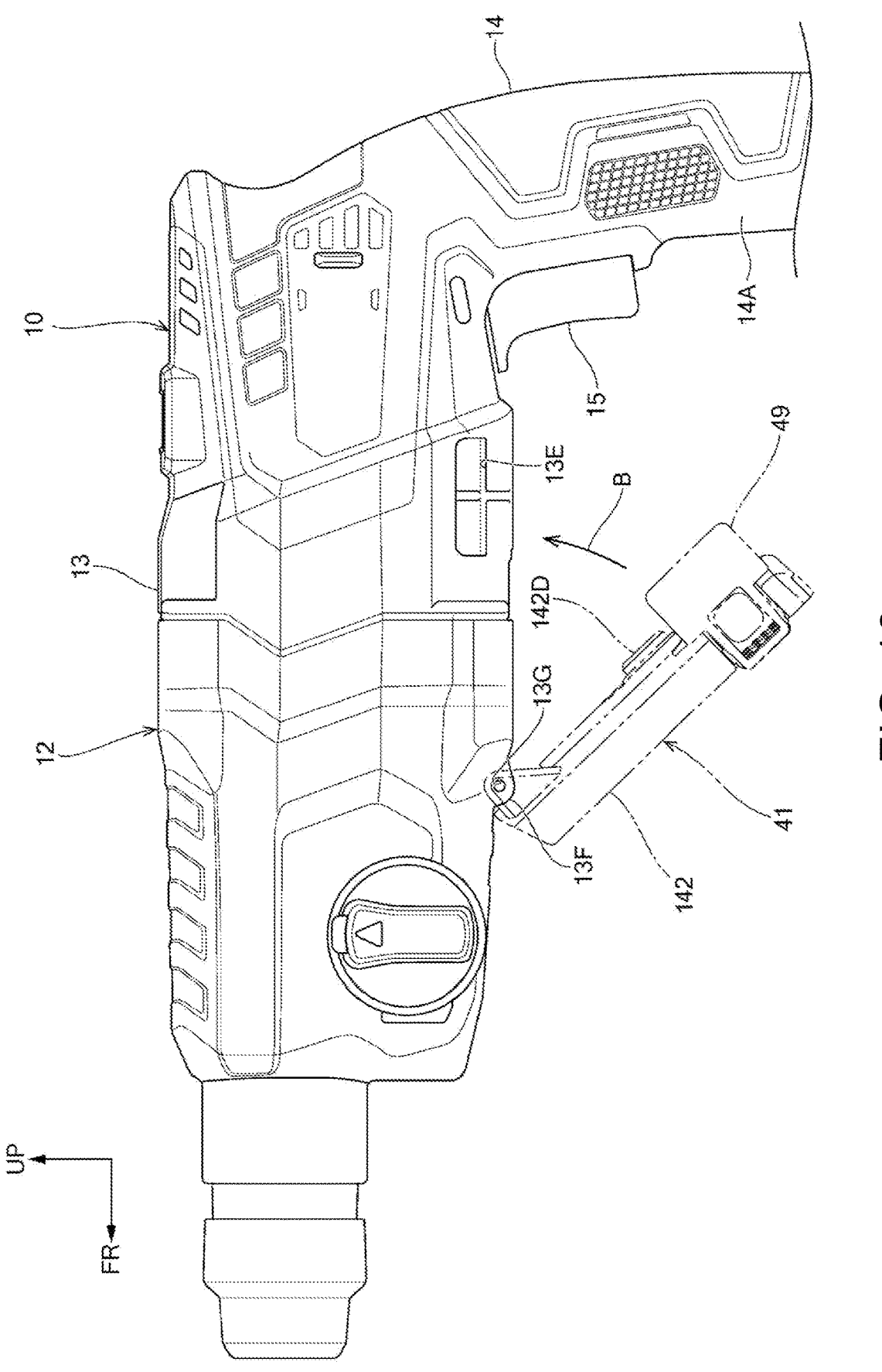
FIG. 19 is a side view illustrating mounting of the adapter shown in FIG. 9 on the hammer drill.

In mounting the dust collection device 40 on the hammer drill 10, the adapter 41 is first mounted on the hammer drill 10. Specifically, as shown in FIG. 19, the adapter 41 is disposed so as to be inclined rearward, and the support shaft 143 of the adapter 41 is disposed on the left side of the support hole 13G of the hammer drill 10. The support shaft 143 is inserted into the support hole 13G from the left side. After the support shaft 143 is inserted into the support hole 13G, the adapter 41 is rotated to one side of the support shaft 143 in the circumferential direction (side in the direction of an arrow B in FIG. 19). Thereby, the upper end portion of the adapter connection portion 142D of the adapter 41 is fitted into the front intake port 13B of the hammer drill 10 from the lower side. Further, the locking hook 49B of the adapter locking member 49 is inserted into the locking recess portion 13E of the main body housing 13, and the adapter locking member 49 is locked to the main body housing 13. As described above, the adapter 41 is mounted on the hammer drill 10.

Figure 20:
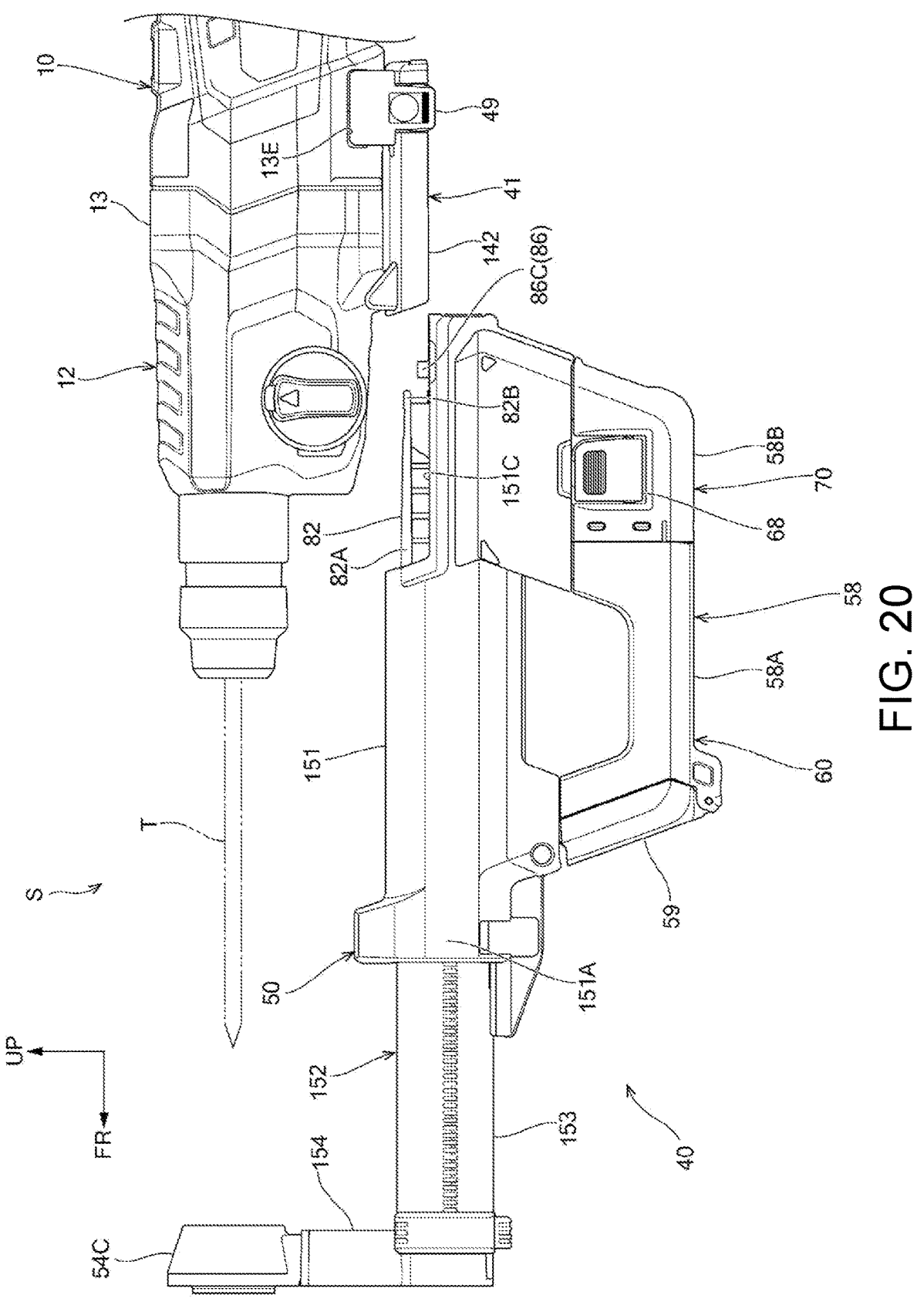
FIG. 20 is a side view illustrating mounting of the dust collection device main body shown in FIG. 17 on the adapter.

After the adapter 41 is mounted on the hammer drill 10, the dust collection device main body 150 is mounted on the adapter 41. Specifically, as shown in FIG. 20, the mounting portion 82 of the dust collection device main body 150 is disposed on the front side of the adapter 41. In this state, the dust collection device main body 150 is moved rearward with respect to the adapter 41, and the mounting portion 82 of the dust collection device main body 150 is inserted into the mounting recess portion 142B of the adapter 41. Specifically, a pair of right and left side rails 82A of the dust collection device main body 150 are inserted into the side rail groove 142C1 of the adapter 41 from the front side. After the side rails 82A are inserted into the side rail groove 142C1, the dust collection device main body 150 is further moved rearward with respect to the adapter 41, and the rear rail 82B of the dust collection device main body 150 is inserted into the rear rail groove 142C2 of the adapter 41 from the front side.

When the insertion of the rear rail 82B into the rear rail groove 142C2 is completed, the dust collection discharge unit 73 of the dust collection device main body 150 is disposed adjacent to the lower side of the adapter connection portion 142D of the adapter 41, and the dust collection outlet 74 of the dust collection device main body 150 and the front intake port 13B of the hammer drill 10 communicate with each other. Thereby, the mounting portion 82 of the dust collection device main body 150 is mounted on the mounting recess portion 142B of the adapter 41. In addition, when the mounting portion 82 is mounted on the mounting recess portion 142B, the stepped portion 151C of the dust collection device main body 150 is disposed adjacent to the lower side of the locking operation portion 49C of the adapter locking member 49.

Meanwhile, when the mounting portion 82 is mounted on the mounting recess portion 142B, as described above, by sliding the dust collection device main body 150 rearward, the lock portion 86C slides leftward due to the inclined surface of the front surface of the lock hook portion 42K and is disposed inside the lock recess portion 46A of the adapter 41. When the lock member 86 is moved to the right side by a spring (not shown) and switched to the locked state, the lock portion 86C is disposed adjacent to the rear side of the lock hook portion 42K, and the lock portion 86C and the lock hook portion 42K are engaged with each other in the front-rear direction. Thereby, the forward movement of the dust collection device main body 150 relative to the adapter 41 is restricted, and the mounting of the dust collection device 40 on the hammer drill 10 is completed.

After the mounting of the dust collection device 40 on the hammer drill 10 is completed, a worker pulls the trigger 15 of the hammer drill 10, so that the motor 20 is driven and the tip tool T rotates around its own axis. This makes it possible to perform drilling on a workpiece. Specifically, the tip tool T is pressed against the workpiece side to perform drilling on the workpiece. In addition, when the motor 20 is driven, the fan 23 rotates together with the drive shaft 21 of the motor 20.

During operation of the hammer drill 10, the second fan unit 23B of the fan 23 generates the air flow AR (see FIG. 10) from the dust collection device main body 150 toward the hammer drill 10. Specifically, the air flow AR that draws the air radially inside the tool insertion portion 54C into the suction unit 154 is generated at the suction port 154B of the dust collection device main body 150.

Thereby, the air around the tip portion of the tip tool T is suctioned into the dust collection device main body 150 through the suction port 154B. That is, dust around the tip tool T containing dust generated during drilling flows from the suction port 154B into the suction unit 154 together with the air. Meanwhile, during drilling of a workpiece, the hammer drill 10 approaches the workpiece as the drilling progresses, and the tool insertion portion 54C of the dust collection device main body 150 comes into contact with the workpiece. Therefore, during drilling of the hammer drill 10, the suction unit 154 is pressed rearward by the workpiece. Thereby, the front intake pipe 57 of the air inflow unit 152 is contracted, and the slide arm 153 and the suction unit 154 are displaced rearward.

The air flow AR having flowed into the suction unit 154 flows rearward through the intake pipe 155 and flows out downward from the pipe outlet portion 56A. The air flow AR having flowed out downward from the pipe outlet portion

56A flows from the cyclone inlet portion 64 into the rear outer cylinder 62 of the cyclone outer cylinder 61. The air flow AR having flowed into the rear outer cylinder 62 flows forward while swirling around the cyclone axis 61A along the inner circumferential surface of the rear outer cylinder 62, and flows out from the front end portion of the rear outer cylinder 62 into the front outer cylinder 63 (see the air flow AR in FIGS. 12 and 17). The air flow AR having flowed out into the front outer cylinder 63 flows forward while swirling around the cyclone axis 61A along the inner circumferential surface of the front outer cylinder 63 (see the air flow AR in FIG. 17). Thereby, air and dust are separated from each other in the swirling chamber 61B, and the separated dust falls from the front-end opening of the front outer cylinder 63 onto the lower surface of the dust collection chamber 60A. In addition, the air flow AR from which the dust has been separated flows rearward through substantially the central portion of the cyclone outer cylinder 61 and flows into the exhaust inner cylinder 65 (see the air flow AR in FIG. 17). The air flow AR having flowed into the exhaust inner cylinder 65 flows from the cyclone outlet hole 66 into the filter chamber 71 of the filter unit 70.

The air flow AR having flowed into the filter chamber 71 flows to the dust collection outlet 74 side of the dust collection device main body 150. That is, in the filter chamber 71, the air flow AR flows upward, passes through the filter 72, and flows to the dust collection discharge unit 73 (see the air flow AR in FIG. 10). Thereby, the dust in the air flow AR is removed by the filter 72, and the air flow AR in which the dust has been removed flows from the dust collection outlet 74 of the dust collection device main body 150 into the main body housing 13.

The air flow AR having flowed into the main body housing 13 flows from the fan intake port 27A of the fan 23 into the second fan unit 23B. The second fins 26 then allow the air flow AR to flow radially outward from the fan 23 and be discharged from the second exhaust ports 13D. As described above, the dust collection device main body 150 can suction the air around the tip tool T, separate dust contained in the air, and collect the separated dust.

Incidentally, when drilling is performed on a workpiece above the hammer drill 10, the hammer drill 10 is set up so that the tip portion of the tip tool T faces upward. Therefore, in the dust collection device 40, the cyclone axis 61A extends in the vertical direction, and the cyclone unit 60 assumes a posture in which the tip portion of the cyclone outer cylinder 61 faces upward. Therefore, the flow velocity of the air flow AR that swirls in the swirling chamber 61B of the cyclone outer cylinder 61 is reduced, and thus there is a possibility of the air and dust not being able to be sufficiently separated from each other in the swirling chamber 61B. In this case, there is concern that the dust will remain in the swirling chamber 61B without being discharged from the tip portion of the swirling chamber 61B of the cyclone outer cylinder 61 to the dust collection chamber 60A. Thereby, there is a possibility of the air flow AR containing the dust flowing from the cyclone unit 60 to the downstream side of the air passage portion 90.

Here, in the cyclone unit 60 of the dust collection device 40, the cyclone outer cylinder 61 is configured to include the rear outer cylinder 62 constituting the rear portion of the cyclone outer cylinder 61 and the front outer cylinder 63 constituting the front portion of the cyclone outer cylinder 61. In addition, the opening 61C is formed between the front end portion of the rear outer cylinder 62 and the rear end portion of the front outer cylinder 63, and the opening 61C opens rearward throughout the front outer cylinder 63 and the rear outer cylinder 62 in the circumferential direction. Therefore, even in a case where the cyclone unit 60 assumes a posture in which the tip portion of the cyclone outer cylinder 61 faces upward, the flow velocity of the air flow AR that swirls in the swirling chamber 61B is reduced, and dust remains in the swirling chamber 61B, the dust remaining in the swirling chamber 61B can be discharged from the opening 61C to the dust collection chamber 60A. This makes it possible to suppress the flow of the air flow AR containing dust from the cyclone unit 60 to the downstream side of the air passage portion 90. Therefore, it is possible to improve the dust collection performance of the dust collection device 40.

In addition, the inner circumferential surface of the front outer cylinder 63 is linearly inclined radially inward toward the front side. That is, the inner diameter of the rear end portion of the front outer cylinder 63 is set to be larger than the inner diameter of the front end portion of the front outer cylinder 63. This makes it possible to increase the flow velocity of the air flow AR in the swirling chamber 61B, thereby allowing the separated dust to be discharged from the swirling chamber 61B to the dust collection chamber 60A.

In addition, the front outer cylinder 63 is formed integrally with the first case 58A, and the rear outer cylinder 62 is formed integrally with the second case 58B. This makes it possible to easily form the opening 61C between the rear outer cylinder 62 and the front outer cylinder 63.

In addition, in the dust collection device 40, the suction port 154B is disposed on the front side of the cyclone unit 60. Therefore, dust generated around the tip portion of the tip tool T extending forward from the main body housing 13 can be sent rearward in the dust collection device 40 and be separated from air in the cyclone unit 60.

Meanwhile, in the second embodiment, in the cyclone unit 60, the opening 61C opens rearward throughout the front outer cylinder 63 and the rear outer cylinder 62 in the circumferential direction, and the dust collection chamber 60A and the swirling chamber 61B communicate with each other through the opening 61C, but a method of communicating between the dust collection chamber 60A and the swirling chamber 61B is not limited thereto. For example, the outside diameters of the front end portion of the rear outer cylinder 62 and the rear end portion of the front outer cylinder 63 may be matched, the front end portion of the rear outer cylinder 62 and the rear end portion of the front outer cylinder 63 may be connected to each other, and the opening 61C that opens radially outward may be formed between the rear outer cylinder 62 and the front outer cylinder 63. That is, the opening 61C is preferably formed in a shape that allows dust remaining in the swirling chamber 61B to be discharged to the dust collection chamber 60A.

In addition, in the second embodiment, the inner circumferential surface of the front outer cylinder 63 in the cyclone unit 60 is linearly inclined radially inward toward the front side in a cross-sectional side view. In other words, the inner circumferential surface of the front outer cylinder 63 is constituted by a single inclined surface. Instead, the inner circumferential surface of the front outer cylinder 63 may be constituted by a plurality of inclined surfaces. In addition, the inner circumferential surface of the front outer cylinder 63 may be curved in an arc shape in a cross-sectional side view.

What is claimed is:

1. An auxiliary device mounted on a work machine to suction air containing dust from around a tip tool of the work machine and discharge air from which the dust has been separated, the device comprising:

a suction unit having a suction port which is disposed on a periphery of the tip tool;

an intake passage portion connected to the suction unit and configured to be stretchable in a first direction;

a cyclone unit connected to the intake passage portion to swirl air having flowed out from the intake passage portion and centrifuge the dust; and a filter unit connected to the cyclone unit, an inside of which is configured as a filter chamber for accommodating a filter, and which has a cylindrical discharge unit having an outlet for discharging air having passed through the filter, wherein the cyclone unit comprises:

a cyclone cylinder unit formed in a cylindrical shape centered on a cyclone axis which extends along the first direction;

a cyclone inlet portion that communicates between the intake passage portion and the cyclone cylinder unit and swirls the air along an inner circumferential surface of the cyclone cylinder unit; and a cyclone outlet portion that communicates between the cyclone cylinder unit and the filter unit, wherein the intake passage portion is arranged side by side with respect to the cyclone unit at one side in a second direction intersecting the first direction where the cyclone unit and the intake passage portion overlap each other in the first direction, the discharge unit is arranged at the one side of the second direction with respect to the filter, and the filter unit is disposed side by side with respect to the cyclone unit and the intake passage portion at one side in the first direction.

2. The auxiliary device according to claim 1, wherein the intake passage portion is disposed on an other side in the first direction with respect to the filter unit.

3. The auxiliary device according to claim 1, wherein in the cyclone unit, the cyclone cylinder unit has an end portion on the one side in the first direction blocked, the cyclone inlet portion has a guide surface extending out from the inner circumferential surface of the cyclone cylinder unit in a tangential direction of the cyclone cylinder unit as viewed in the first direction, and the cyclone outlet portion is formed at an end portion of the cyclone cylinder unit on the one side in the first direction.

4. The auxiliary device according to claim 3, wherein the cyclone unit has pluralities of the cyclone cylinder units, the cyclone inlet portions, and the cyclone outlet portions, all equal in number.

5. The auxiliary device according to claim 4, wherein the intake passage portion and the cyclone unit are arranged side by side in the second direction as viewed in the first direction, and the cyclone unit has a pair of cyclone cylinder units, the pair of cyclone cylinder units being arranged side by side in a third direction intersecting the first direction and the second direction.

6. The auxiliary device according to claim 5, wherein a center of the intake passage portion is disposed between the cyclone axes of the pair of cyclone cylinder units in the third direction.

7. The auxiliary device according to claim 3, wherein the intake passage portion and the cyclone unit are arranged side by side in a second direction intersecting the first direction as viewed in the first direction, the filter is formed in a pleated shape folded in the first direction, and the cyclone outlet portion is disposed on the one side in the second direction with respect to the filter and the outlet is disposed on the other side in the second direction with respect to the filter.

8. The auxiliary device according to claim 1, wherein the filter unit overlaps the cyclone unit and the intake passage portion as viewed in the first direction.

9. A work machine system comprising:

a work machine; and the auxiliary device according to claim 1, the work machine including a motor having a drive shaft, a tip tool which is driven by rotation of the drive shaft, a mechanism unit that drives the tip tool by the rotation of the drive shaft, a housing accommodating the motor and the mechanism unit, having the auxiliary device mounted thereon, and having an intake port to be connected to an outlet of the auxiliary device, and a fan accommodated in the housing to generate an air flow from a suction port of the auxiliary device toward the intake port by the rotation of the drive shaft.

10. The work machine system according to claim 9, wherein the housing is configured to include:

a main body housing unit accommodating the motor and the mechanism unit; and a handle housing unit extending out from an end portion of the main body housing unit on the one side in the first direction and having a handle unit to be gripped by a worker, wherein the filter unit is located between the cyclone unit and the handle unit in the first direction.

11. The work machine system according to claim 10, wherein the main body housing unit extends in the first direction.

12. The work machine system according to claim 9, wherein the fan, the intake port, and filter unit are disposed at positions where they overlap each other in the first direction.

13. The work machine system according to claim 12, wherein the filter unit is disposed between the fan and the mechanism unit in the first direction.

14. An auxiliary device mounted on a work machine to suction air containing dust from around a tip tool of the work machine and discharge air from which the dust has been separated, the device comprising:

a suction unit having a suction port which is disposed on a periphery of the tip tool;

an intake passage portion connected to the suction unit and configured to be stretchable in a first direction;

a cyclone unit connected to the intake passage portion to swirl air having flowed out from the intake passage portion and centrifuge the dust; and a filter unit connected to the cyclone unit, an inside of which is configured as a filter chamber for accommodating a filter, and which has an outlet for discharging air having passed through the filter, wherein the cyclone unit comprises:

a cyclone cylinder unit formed in a cylindrical shape centered on a cyclone axis which extends along the first direction;

a cyclone inlet portion that communicates between the intake passage portion and the cyclone cylinder unit and swirls the air along an inner circumferential surface of the cyclone cylinder unit; and a cyclone outlet portion that communicates between the cyclone cylinder unit and the filter unit, wherein the cyclone unit and the intake passage portion are disposed at positions where the cyclone unit and the intake passage portion overlap each other in the first direction, and the filter unit is disposed on one side of the cyclone unit in the first direction, the cyclone outlet portion is formed at an end portion of the cyclone cylinder unit on the one side in the first direction, wherein the cyclone cylinder unit includes:

a first cylinder unit constituting a portion of the cyclone cylinder unit on the one side in the first direction and having a constant inner diameter; and a second cylinder unit constituting a portion of the cyclone cylinder unit on the other side in the first direction, an inner diameter of an end portion on the one side in the first direction being larger than an inner diameter of an end portion on the other side in the first direction, wherein a gap is formed between the first cylinder unit and the second cylinder unit, and the inner diameter of the end portion of the second cylinder unit on the one side in the first direction is set to be larger than the inner diameter of the first cylinder unit.

15. An auxiliary device mounted on a work machine to suction air containing dust from around a tip tool of the work machine and discharge air from which the dust has been separated, the device comprising:

a suction unit having a suction port which is disposed on a periphery of the tip tool;

an intake passage portion connected to the suction unit and configured to be stretchable in a first direction;

a cyclone unit connected to the intake passage portion to swirl air having flowed out from the intake passage portion and centrifuge the dust; and a filter unit connected to the cyclone unit, an inside of which is configured as a filter chamber for accommodating a filter, and which has an outlet for discharging air having passed through the filter, wherein the cyclone unit comprises:

a cyclone cylinder unit formed in a cylindrical shape centered on a cyclone axis which extends along the first direction;

a cyclone inlet portion that communicates between the intake passage portion and the cyclone cylinder unit and swirls the air along an inner circumferential surface of the cyclone cylinder unit; and a cyclone outlet portion that communicates between the cyclone cylinder unit and the filter unit, wherein the cyclone unit and the intake passage portion are disposed at positions where the cyclone unit and the intake passage portion overlap each other in the first direction, and the filter unit is disposed on one side of the cyclone unit in the first direction, the cyclone outlet portion is formed at an end portion of the cyclone cylinder unit on the one side in the first direction, wherein the cyclone cylinder unit includes:

a first outer cylinder formed in a bottomed cylindrical shape with an end portion on the one side in the first direction blocked, an inside of which is configured as a swirling chamber, and which has a cyclone inlet hole serving as the cyclone inlet portion and a cyclone outlet hole serving as the cyclone outlet portion;

a second outer cylinder formed in a cylindrical shape, disposed coaxially with the first outer cylinder, and at least a portion of which is disposed to be shifted to the other side of the first outer cylinder in an axial direction with respect to the first outer cylinder to form the swirling chamber therein in cooperation with the first outer cylinder; and a dust collection chamber outer wall having a dust collection chamber therein that accommodates the first outer cylinder and the second outer cylinder and communicates with an end portion of the second outer cylinder on the other side in the first direction, wherein an opening is formed between the first outer cylinder and the second outer cylinder, and the swirling chamber and the dust collection chamber communicate with each other through the opening.

\* \* \* \* \*